US007337077B2

(12) United States Patent
Sugioka

(10) Patent No.: US 7,337,077 B2
(45) Date of Patent: Feb. 26, 2008

(54) PROGRAM FOR CALCULATING DISPLACEMENT OF FLUID AND METHOD FOR ACQUIRING VARIABLES

(75) Inventor: Hideyuki Sugioka, Palo Alto, CA (US)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 11/115,232

(22) Filed: Apr. 27, 2005

(65) Prior Publication Data

US 2005/0288875 A1 Dec. 29, 2005

(30) Foreign Application Priority Data

| | | | |
|---|---|---|---|
| Apr. 28, 2004 | (JP) | ............................. | 2004-133645 |
| Jul. 28, 2004 | (JP) | ............................. | 2004-220387 |
| Jul. 30, 2004 | (JP) | ............................. | 2004-223570 |

(51) Int. Cl.
*G01N 11/00* (2006.01)

(52) U.S. Cl. ........................................................ 702/50

(58) Field of Classification Search .................. 702/12, 702/45, 50, 100; 73/861

See application file for complete search history.

(56) References Cited

U.S. PATENT DOCUMENTS

| | | | |
|---|---|---|---|
| 7,056,008 B2 * | 6/2006 | Rondeau et al. ............... | 366/8 |
| 2002/0189360 A1 * | 12/2002 | Kawasaki .................... | 73/649 |
| 2005/0288608 A1 * | 12/2005 | Corcos ....................... | 600/584 |
| 2007/0213944 A1 * | 9/2007 | Matsuzawa et al. .......... | 702/45 |

OTHER PUBLICATIONS

"Precise Theory of Absorption and Dispersion of Forced Plane Infinitesimal Waves According To The Navier-Stokes Equations", C. Truesdell, 1953, J. Rational Mech. Anal., 2(4), pp. 643-741.

"Unified Numerical Procedure For Compressible And Incompressible Fluid", Yabe, T., et al., Journal of Physical Society of Japan, vol. 60.. No. 7, Jul. 1991. pp. 2105-2108.

T. Yabe et al. A Universal Solver for Hyperbolic Equations by Cubic-Polynomial Interpolation I. One-Dimensional Solver; Computer Physics Commun. 66, pp. 219-232, 1991.

Q. Zhang et al., "Investigations of the Coupling Methods for FSI Analysis by FEM", *Mechanical Society of Japan, Treatises (edition A)*, vol. 67, No. 662 (Oct. 2001), pp. 1556-1562.

Q. Zhang et al., "Analysis of Fluid-Structure Interaction Problems with Structural Buckling and large Domain Change by ALE Finite element Model", *Mechanical Society of Japan, Treatises (edition A)*, vol. 67, No. 654 (Feb. 2001), pp. 195-202.

* cited by examiner

*Primary Examiner*—Michael P. Nghiem
(74) *Attorney, Agent, or Firm*—Fitzpatrick, Cella, Harper & Scinto

(57) ABSTRACT

In calculating a displacement of a fluid, the displacement is calculated with the fluid regarded as an elastic structural body for a given period of time. This is founded on the idea that fluid is a substance that undergoes transition from a state (1) at time t1 to a state (2) at time t2 through a motion state in such manner that the fluid can be considered as an elastic body for a short period of time, after which all "memory" of elastic deformation is lost, leaving only quantities of state.

17 Claims, 20 Drawing Sheets

CONSIDERING MOVEMENT $$\dot{\vec{u}}_i^n \Delta t$$

THEN $$\tilde{\dot{\vec{u}}}_i^n = \dot{\vec{u}}_i^n \left(\vec{x}_i - \dot{\vec{u}}_i^n \Delta t\right)$$

$$\dot{\vec{u}}_i^{n+1} = \tilde{\dot{\vec{u}}}_i^n + \dot{\vec{u}}_i^n g\Delta t$$

CALCULATING MOVEMENT $$\vec{u}_i^{n+1}$$

THEN, AS EXAMPLE, $$\dot{\vec{u}}_i^{n+1} = \vec{u}^n / \Delta t$$

PROGRAM FOR CALCULATING DISPLACEMENT OF FLUID AND METHOD FOR ACQUIRING VARIABLES

BACKGROUND OF THE INVENTION

1. Field of the Invention

The present invention relates to a numerical value calculation method and a design analysis system that are applied to the design and analysis of MEMS (Micro-Electro Mechanical Systems) devices and NEMS (Nano-Electro Mechanical Systems) devices, and more particularly, to a unified method of calculating gas, liquid and solid compression or non-compression, which is superior in the coupled calculation with an elastic structural body, and a design analysis system.

2. Related Background Art

Recently, there is an increasing demand for CAD apparatus which performs design analysis of devices applying nano-technology such as a MEMS device or NEMS device, along with the development of the solid micro-machining technology. In such CAD apparatus, it is important that the integrated analysis and design can be made always easily by many physics such as light, electromagnetism, electrostatics, elasticity, fluid, electric circuit and so on. Especially in the case of a MEMS element that works in the atmosphere, it is an important subject to establish a fluid structure coupled calculation method that can analyze and design the interaction between the air and a structure such as air resistance and viscosity in detail, stably and precisely to predict its movement before trial manufacture.

A miniaturization analysis system μ-TAS (Micro Total Analysis System) or Lab on a Chip which integrates the liquid elements such as pumps and valves as well as sensors in minute flow paths formed on a substrate of glass or silicone is attracting attention. The μ-TAS is expected to be used for applications in medical fields such as home medical treatment and a bedside monitors, and in bio-fields such as DNA analysis and proteome analysis, because it allows miniaturization and lower price of the system, and greatly shortens the analysis time. However, the establishment of the fluid structure coupled calculation method capable of analyzing and designing the interaction between the fluid and the elastic structural body in detail, stably and precisely is an important subject for the design and analysis of μ-TAS or elements relating to μ-TAS.

The coupling analysis methods for the structure and the fluid are largely divided into a weak coupling calculation method, a strong coupling calculation method and a method using restraint conditions. The weak coupling calculation method is one in which the elastic structure calculation and the fluid calculation are performed alternately by modifying the boundary conditions mutually, in which if the time increment is not sufficiently short, numerical instability may occur, causing the solution to diverge. However, there is the advantage that it can substantially utilize the existing fluid solver and the existing elastic structure calculation solver.

On the other hand, the strong coupling calculation method is one in which the variable of the fluid calculation and the variable of the structure calculation are determined at the same time. In Mechanical Society of Japan, treatises (edition A), Vol. 67, No. 662 (2001-10) p. 1555-1562, formula (4) and formula (10) (non-patent document 1) and Mechanical Society of Japan, treatises (edition A), Vol. 67, No. 654 (2001-2) p. 195 (non-patent document 2), the results of simulating the pulsation of an artificial heart blood pump by the strong coupling method in which the Arbitary Lagrangian Eulerian (ALE) finite element method was employed for the fluid area and the total Lagrange's method was applied to the structural area were disclosed by Gun Cho and Toshiaki Kubo. It is excellent in stability, but not absolutely assured. Because the Navier-Stokes equation is employed as the fundamental equation for the fluid, and the elastic structural body is formulated based on the Navier equation, it is a complex calculation method with abundant variables in which the pressure and velocity are variables for the fluid, and the displacement and velocity are taken as variables for the elastic structural body, whereby the coding becomes complicated. Also, the setup of boundary conditions is likely to become complicated. Moreover, it is likely to be more complicated to expand it to coupling of the compressible fluid and the elastic structural body, because of the coupling method of the incompressible fluid and the elastic structural body.

Also, there is the Slave-Master algorithm as a method using the restraint conditions.

The fluid calculation methods are largely divided into DM (Different Method) such as the VOF (Volume Of Fraction) method and the CIP (Cubic Interpolated Pseudo-Particle) method, the FEM (Finite Element Method) including the calculation method coping with the movable boundary to some extent by means of the ALE (Arbitrary Lagrangian-Eulerian) method, and a particle method such as PIC (Particle In Cell) and SPH (Smoothed Particle Hydrodynamics). Though each method has its respective advantage, the development and promotion of the calculation method of finite element system that can deal with the free shape of element strictly, if possible, was expected for the design and analysis of MEMS device or NEMS device such as μ-TAS valves and pumps.

SUMMARY OF THE INVENTION

As described above, the conventional fluid-structure coupling calculation method has the problem that the weak coupling method is sought for stability, and the strong coupling method is complex in the coding and has many variables. Also, the extension of the strong coupling method to a compressible fluid is difficult.

This invention has been achieved in the light of the above-mentioned problems associated with the prior art, and it is an object of the invention to provide a unified calculation method for calculating the compressible/incompressible fluid and the structure and a design analysis system, employing an existent elastic body solver, in which the setup of variables and boundary conditions is simple, the use of memory is reduced, the coding is easily made, and stable calculation is realized.

Thus, the present invention provides a program for calculating a displacement of a fluid where the fluid is regarded as an elastic structural body for a given period of time.

Also, the invention provides a calculator for calculating the displacement of a fluid, comprising means for calculating the displacement where the fluid is regarded as an elastic structural body for a given period of time.

Also, the invention provides an acquisition method for acquiring variables concerning at least the state of a fluid, comprising a step of acquiring the information concerning at least the information of said fluid, and a step of acquiring variables concerning at least the state of said fluid by analyzing said acquired information by Lagrange's method.

Also, the invention provides a system for acquiring variables concerning at least the state of a fluid, comprising means for acquiring information concerning at least the information of said fluid, and means for acquiring variables concerning at least the state of the fluid by analyzing said acquired information by Lagrange's method.

Moreover, the invention provides a calculation method comprises a step of transforming the physical property data of said fluid into structural body data where the fluid is regarded as an elastic body for a short period of time with means for inputting fluid data, a step of feeding said structural body data to an external structure calculation solver and executing a structure calculation, and a step of updating the variables and resetting the displacement of the fluid.

DESCRIPTION OF THE PREFERRED EMBODIMENTS

Embodiment 1

Figure 1:
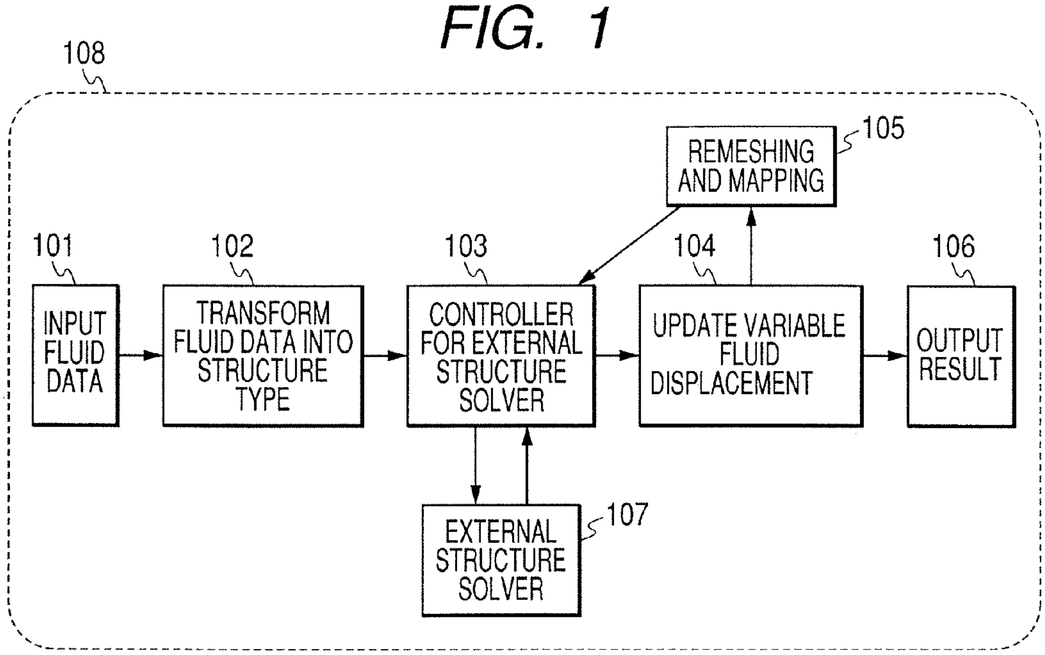
FIG. 1 is a block diagram showing an embodiment 1 of the present invention.
Figure 2:
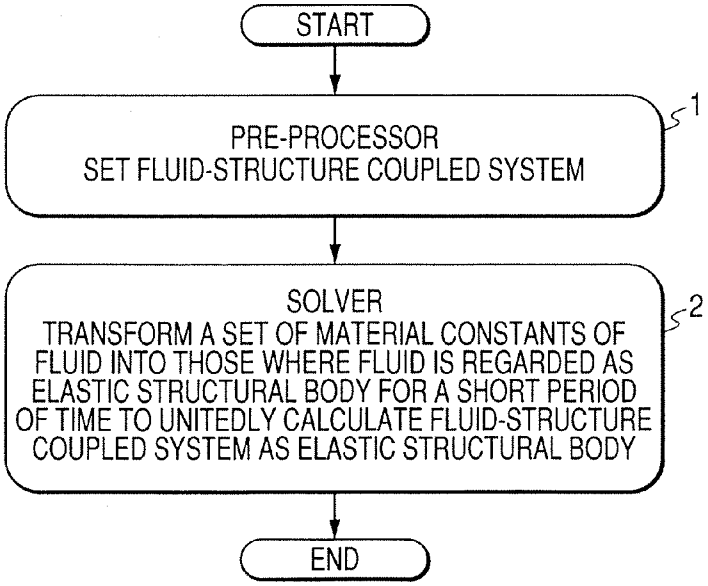
FIG. 2 is a block diagram showing the embodiment 1 of the invention.

FIG. 1 is a diagram showing the features of the present invention. Reference numeral 101 designates means for inputting fluid data, 102 designates means for transforming physical property data of fluid into structural data where the fluid is regarded as an elastic body for a short period of time, 103 designates means for feeding data to an external structure calculation solver to perform structure calculation, 104 designates means for updating variables and resetting the displacement of fluid, 105 designates means for remeshing and mapping, 106 designates means for outputting the results, and 108 designates a design analysis system of the invention, comprising the means 101 to 106. Also, reference numeral 107 designates an external structure solver.

That is, the invention provides a unified calculation method for the compressible/incompressible fluid and the structure and a design analysis system, comprising means for inputting fluid data, means for transforming fluid physical property data into structural data, means for feeding data to the external structure calculation solver to perform the structure calculation, and means for updating the variables and resetting the displacement of fluid, whereby the setup of variables and boundary conditions is simple, the use memory is saved, the coding is easy, and the stable calculation is realized.

The present invention is an analysis system making use of a design analysis method for making the calculation where the fluid is regarded as a structural body for a short period of time, or a design analysis system for calculating the fluid, employing an external elastic body solver.

Figure 3:
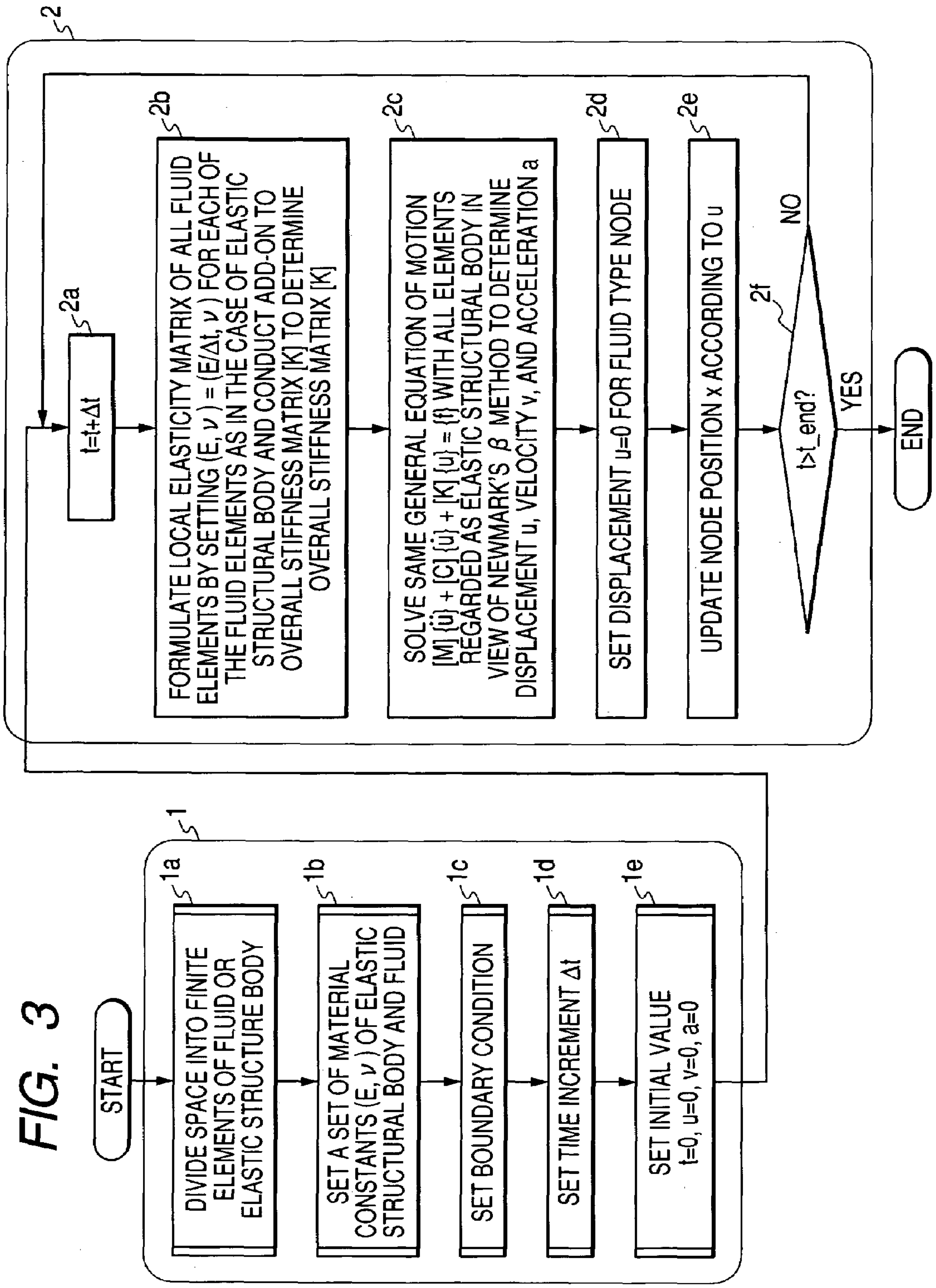
FIG. 3 is a block diagram showing an algorithm of the embodiment 1.

FIG. 3 is an explanatory diagram for explaining the method for calculating a fluid-structure coupled system, where the fluid is regarded as a structural body for a short period of time. A preprocessor equivalent section 1 is composed of the following 1*a* to 1*e*:

(1*a*) A part for dividing the space into finite elements of fluid or elastic structural body, (1*b*) A part for setting a material constant set (E, ν) of elastic structural body and fluid, (1*c*) A part for setting boundary conditions, (1*d*) A part for setting time increment $\Delta t$, and (1*e*) A part for setting initial values of time, displacement, velocity and acceleration.

Also, the solver section 2 is composed of the following 2*a* to 2*f*:

(2*a*) A part for increasing the time by a short period of time $\Delta t$, (2*b*) A part for setting $(E, \nu)=(E/\Delta t, \nu)$, creating a local elasticity matrix like the elastic structural body, adding on to an overall stiffness matrix [K], and determining the overall stiffness matrix [K], if each element is a fluid element, (2*c*) A part for solving the same general equation of motion as the elastic structural body in view of Newmark's β method to determine the displacement u, velocity v and acceleration a, (2*d*) A part for setting u=0 for the fluid type node, (2*e*) A part for updating the node position x according to u, and (2*f*) A part for comparing the end time t_end and the time t to make the end discrimination.

Figure 4:
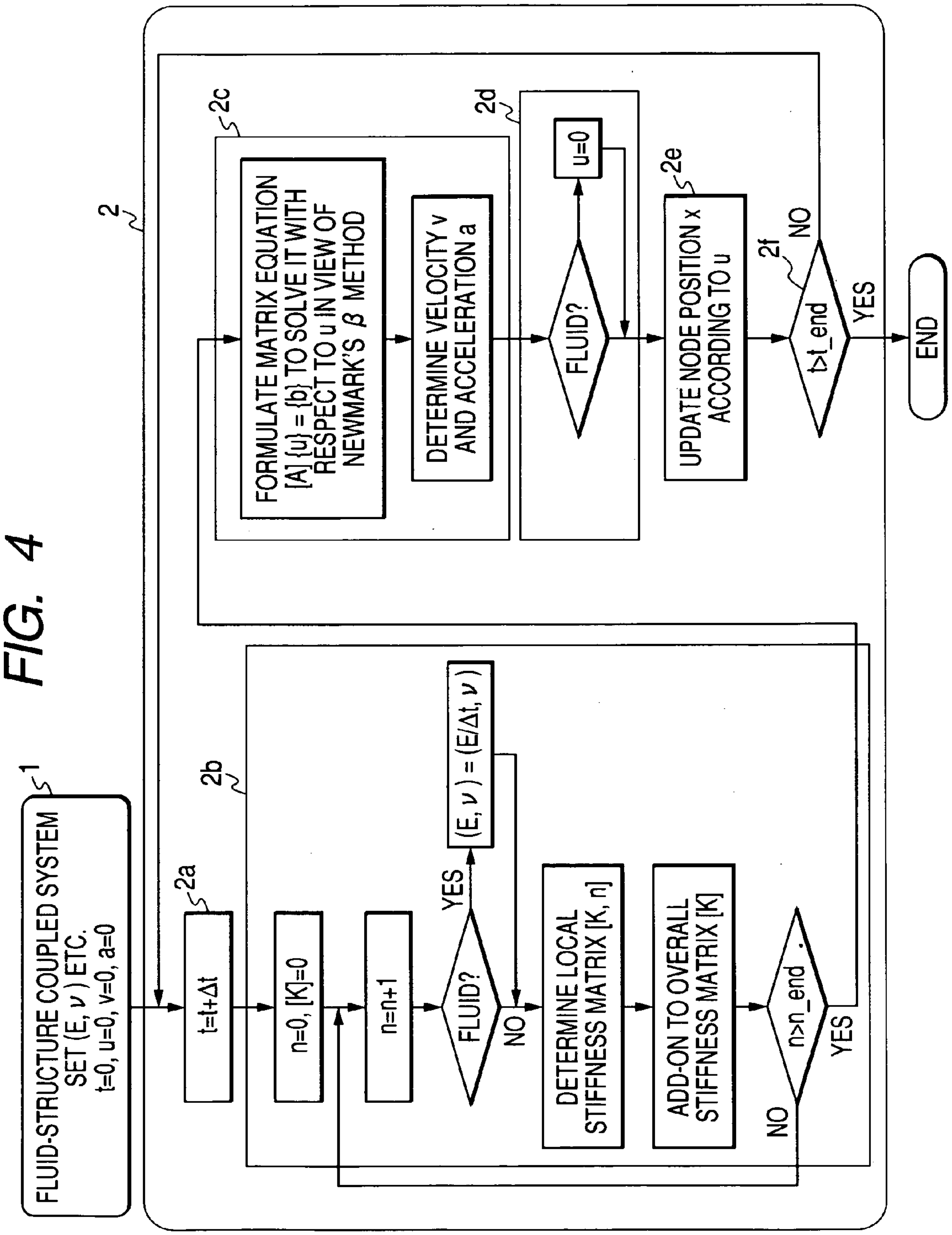
FIG. 4 is a block diagram showing in more detail the algorithm of the embodiment 1.

FIG. 4 is a diagram showing the parts 2*b*, 2*c* and 2*d* in more detail. In embodiment 1 as shown in FIG. 4, the space is divided into minute finite elements of fluid or elastic structural body, the local elasticity matrix is calculated for the elastic structural body, employing an appropriate set of elastic structural body material constants, or the local elasticity matrix is calculated for the fluid element, employing a corresponding set of elastic structural body constants obtained by multiplying the fluid parameters containing the time dimension by a short period of time Δt or 1/Δt to offset the time dimension, thereby acquiring the overall matrix, and the system consisting of the fluid and the elastic structural body is calculated by solving the same equation of motion $$[M]\{\ddot{u}\}+[C]\{\dot{u}\}+[K]\{u\}=\{f\}$$

whereby a unified calculation method for the compressible/incompressible fluid and structure and a design analysis system are provided in which the setup of variables and boundary conditions is simple, the use of memory is reduced, the coding is easy, and a stable calculation is realized, where [M] is a mass matrix, [C] is a damping matrix, [K] is a stiffness matrix, and [u] is a nodal displacement vector, "•" is time differential and {f} is a vector relating to a force applied to the node.

Figure 23:
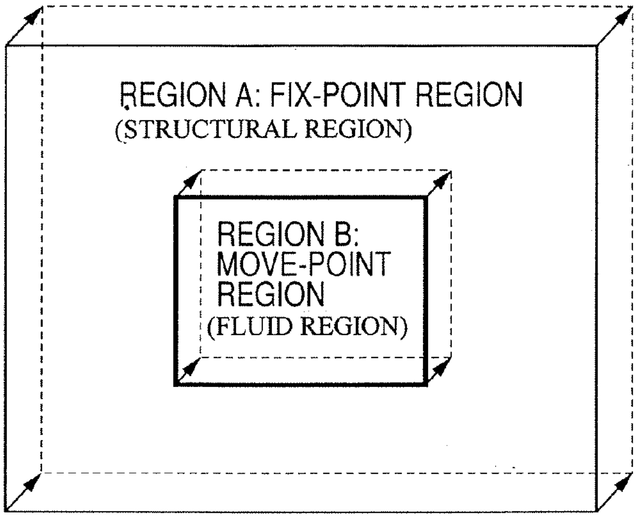
FIG. 23 is an explanatory view for explaining a zone in computation region.

Also, it is determined whether or not the node is the fluid type. For the fluid type node, the displacement is set to zero because no elastic deformation is maintained. Herein, when the space is meshed, the boundary node surrounding the structure type region (REGION A, FIG. 23) and the nodes internal to that region are defined as the structural type nodes, and the nodes surrounding the fluid region (REGION B. FIG. 23) and nodes internal to the fluid region are defined as fluid type nodes, and nodes on the boundary of structural element with the fluid are made structural type nodes. With this method, the structure and fluid are unitedly solved without needing calculation in consideration of the boundary between the structure and fluid, unlike other methods, giving rise to the effect that other boundary conditions, including, for example, the wall (fixed wall and movable wall) boundary condition, pressure boundary condition and symmetric boundary condition, need no special treatments, and the code is simplified.

Considering an isotropic elastic structural body, the number of thermodynamic independent variables is 2, and the material constant set of any two variables that are mutually convertible may be employed. For example, the (E, v)_(structure) set using Young's modulus E (Pa) and Poisson's ratio v (dimensionless), or the (λ, μ)_structure material set using the Lame's constants λ, μ may be employed. For the structure, there are the following relations:

$$E=\mu(3\lambda+2\mu)/(\lambda+\mu)$$

$$v=0.5\lambda/(\lambda+\mu)$$

Besides, the shear elastic modulus (modulus of rigidity) G and the bulk modulus (compressibility) K have the relations $$G=\mu$$

$$K=(3\lambda+2\mu)/3$$

and may be employed as the variables for the set.

For the isotropic fluid, the same relations hold as above, and the set of material constants for the fluid may be the (λ, μ)_fluid material set using a first viscosity μ and a second viscosity λ. Herein, (λ, μ) of the fluid is the material set corresponding to (λ, μ) of the above structure, and because the physical origin is identical although the unit is different, the same symbols are usually employed. Herein, for the fluid, there are the same relations $$E=\mu(3\lambda+2\mu)/(\lambda+\mu)$$

$$V=0.5\lambda/(\lambda+\mu)$$

where the unit of E is Pa and the units of s, v are dimensionless.

The correspondence of the material constants between the fluid and the elastic structural body suggests that the fluid has the same properties as the elastic structural body for a short period of time, although the calculation method and the design analysis system did not positively utilize this property for the algorithm in the numerical calculation practiced so far. That is, the invention provides the first calculation method that positively utilizes the fact that the fluid has the same property as the elastic structural body for a short period of time for the algorithm.

Also, the viscous fluid is subjected to the same stress, except that it does not maintain the elastic deformation. Normally, the fluid stress is described in terms of the velocity vector, and the elastic structural body stress is described in terms of the displacement vector.

This invention provides the first numerical calculation method for calculating a virtual displacement vector (imaginary displacement vector) assumed for the fluid as the variable, in which the virtual displacement is calculated where the fluid is regarded as an elastic structural body for a short period of time, as previously described.

These conditions for the velocity and displacement are also applied to respective governing equations. For example, the Navier-Stokes equation, which is one of the fundamental equations for the fluid, is described for the velocity vector, and the Navier equation describing the elastic structure is described for the displacement vector.

Figure 5A:
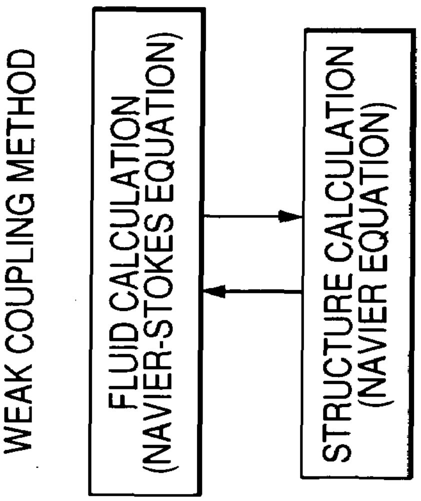
FIGS. 5A, 5B and 5C are explanatory diagrams of a fluid-structure coupling method.
Figure 5B:
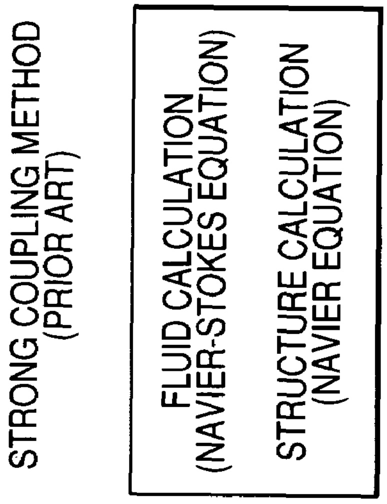
Figure 5C:
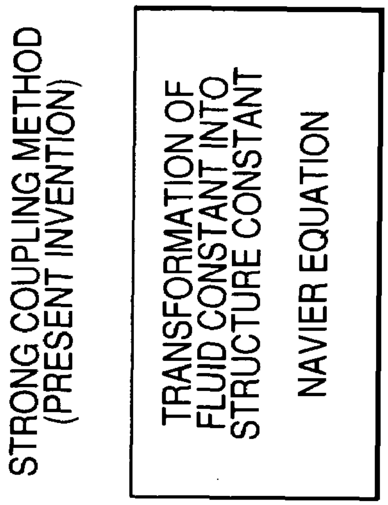

FIGS. 5A to 5C are diagrams showing the comparison of the fluid-structure coupling methods. FIG. 5A is a weak coupling method for solving the Navier-Stokes equation and the Navier equation alternately by modifying the boundary conditions, FIG. 5B is a conventional strong coupling method for solving the Navier-Stokes equation and the Navier equation at the same time, and FIG. 5C is an inventive method for unitedly solving the Navier equation alone after transformation of fluid constants into structure constants.

It was apprehended that the weak coupling method may become unstable and the conventional strong coupling calculation method may involve complex calculation with many variables, as already described.

On the contrary, the inventive method for unitedly solving the Navier equation alone after transformation of fluid constants into structure constants realizes a stable calculation with essentially less parameters. That is, this invention provides a unified calculation method for the compressible/incompressible fluid and structure and a design analysis system by, particularly for the fluid-structure coupled system, transforming the material constants of the fluid into the set of material constants where the fluid is regarded as an elastic structural body for a short period of time, and unitedly calculating the fluid-structure coupled system on the basis of the Navier equation as the elastic structural body, whereby the setup of variables and boundary conditions is simple, the use of memory is reduced, the coding is easy, and a stable calculation is realized.

Particularly, a time integration method for the differential equation of second order of the elastic structural body, preferably, Newmark's β method is unitedly employed as the calculation method for the overall structure-fluid coupled system, whereby the stability of the system is secured.

Especially with the Newmark's β method, it is known that the system is unconditionally stable at $\delta=1/2$ and $\beta>=1/4$. Wilson's θ method may be employed as a time integration method. It is noted here that an external difference between the elastic structural body type calculation and the fluid type calculation strongly occurs on the time integration. The fluid calculation method has developed as a first order differential calculation means for the flow rate, whereas the elastic structural body calculation method has evolved as a second order differential calculation means for the displacement. In the previous calculation by Cho et al., the Navier-Stokes equation is employed for the fluid to provide the first order differential type calculation means for the flow rate, whereas the Navier equation is employed for the elastic structural body to provide the second order differential type calculation means, whereby the second order differential type time integration method is not employed for the overall structure and fluid system.

As will be apparent from non-patent document 1, the strong coupling method by Cho et al. involves firstly choosing pressure, velocity vector and displacement vector as variables, and finally determining the pressure and velocity vector, whereas the inventive method provides a calculation method for the first time, which involves, for the fluid structure system, unitedly formulating the displacement vector alone as the variable, and reducing the number of variables, as a unified solution of the Navier equation alone, to include the conditions capable of assuring the absolute stability in principle.

Many variables in the determinant of the final multidimensional simultaneous equations increase the calculation time. It is known that the calculation time may possibly increase to the extent of the square of the variable, depending on the kind of matrix solution. The present invention has at least the effect that the calculation speed is remarkably higher than the conventional calculation method, because of no pressure variable. More specifically, in this invention, for the overall fluid structure system, an equation [A]{u}={b} is solved employing the Newmark's β method.

Thermodynamically, for the fluid, U=U(S,V,Ni) is basically employed as the fundamental equation for energy representation. Herein, S, V and Ni are called extensive variables, in which S is entropy, V is volume and N is the number of particles. On the contrary, the intensive variables are $$\partial U/\partial S \equiv T \text{ (Temperature)}$$

$$\partial U/\partial V \equiv -P \text{ (Pressure)}$$

$$\partial U/\partial N_i \equiv \mu_i \text{ (Chemical potential)}$$

The normal calculation for the fluid that is not in thermal equilibrium state is formulated in most cases, employing the above intensive variables, assuming the local equilibrium. Especially for the incompressible fluid, the pressure P alone is expressly employed as a thermodynamic variable. Both the Euler's equation and the Navier-Stokes equation employ pressure P as an intensive variable.

On the other hand, the solid system involving the elasticity, or the elastic structural body is expressed, employing the energy representation, $$U=U(S, V_0\Sigma_1, V_0\Sigma_2, V_0\Sigma_3, V_0\Sigma_4, V_0\Sigma_5, V_0\Sigma_6, N_1, N_2, \ldots)$$

where six Σi (i=1 to 6) are called strain components. The actual volume of a strained system is $$V=V_0+V_0\Sigma_1+V_0\Sigma_2+V_0\Sigma_3$$

and the thermodynamics of a strained solid is expressly related with the previous simpler thermodynamics of the fluid owing to this formula.

The calculation method of the invention involves, for the fluid, starting from the thermodynamic fundamental equation in the same type of representation as the solid, and as the normal fluid equation is derived, introducing the local equilibrium approximation, or approximation to thermodynamically treat the heterogeneous system not under thermal equilibrium conditions as a whole, and taking into consideration the flow field with the conservation of mass, momentum and energy, whereby the invention offers a novel method capable of unitedly treating the solid and the fluid. Accordingly, this invention provides a calculation method and a design analysis system that do not rely on a specific calculation method such as the finite element method, particle method, or difference calculus, but calculates the virtual displacement where the fluid is regarded as an elastic structural body for a short period of time, thereby making a new proposal for the unified solution of the compressible/incompressible fluid and structure, regardless of whether the compression fluid or incompressible fluid, or without distinction between the solid and the liquid.

Figure 6:
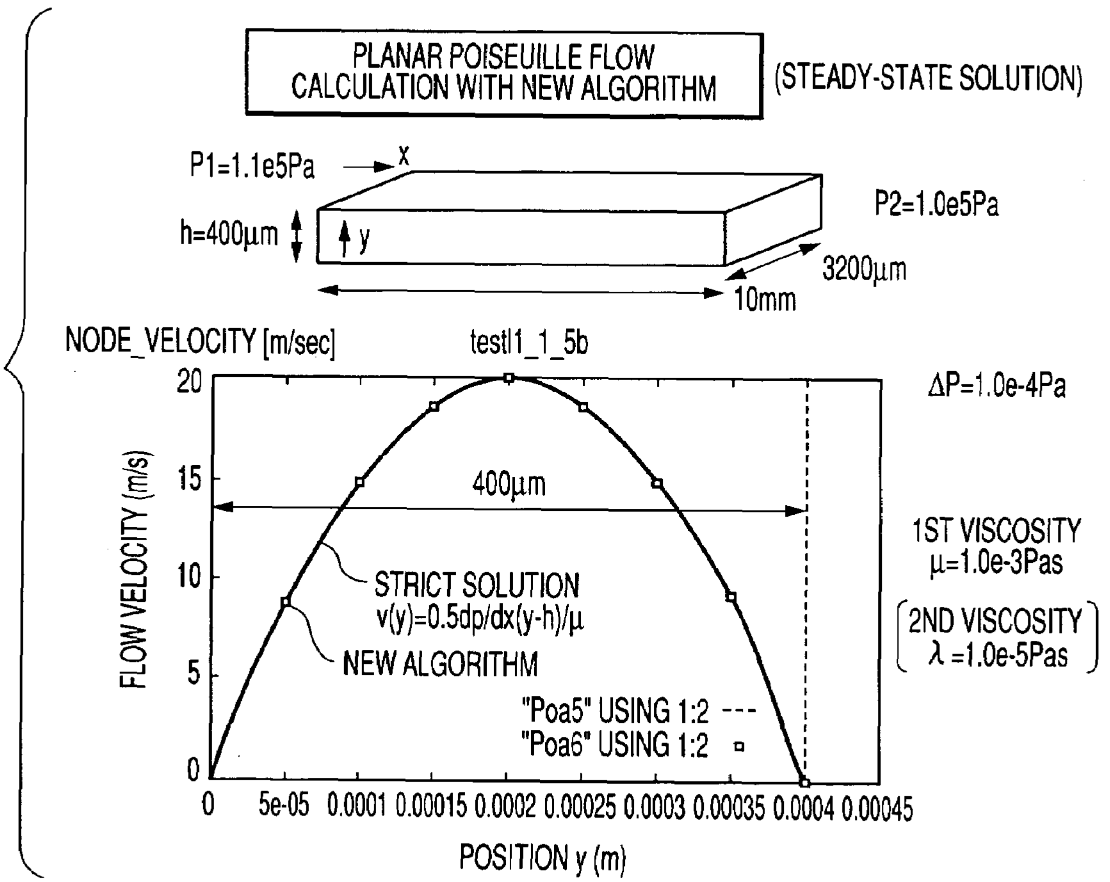
FIG. 6 is a diagram showing the results of comparing the strict solution for planar Poiseuille flow with the inventive method.
Figure 7:
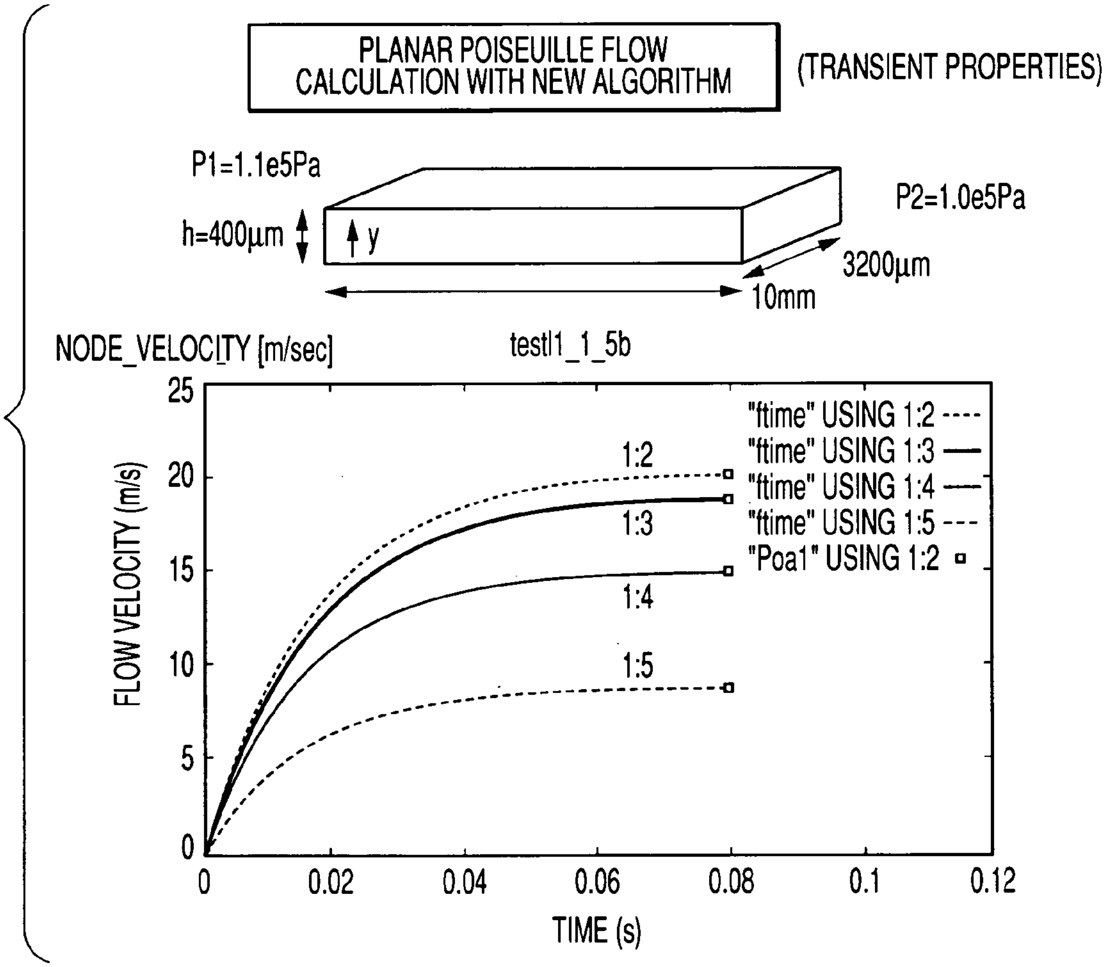
FIG. 7 is a view showing the results of calculating the time response of planar Poiseuille flow according to the invention.

FIG. 6 is a diagram showing the results by the calculation method of the invention for calculating the flow rate in a steady state after applying a difference pressure ΔP=1.0e−4 Pa to a fluid system in which a viscous fluid is sandwiched by two fully wide plates by calculating the virtual displacement where the fluid is regarded as an elastic structural body for a short period of time, as compared with the following strict solution of planar Poiseuille flow for the incompressible fluid:

$$V(y)=0.5dp/dx(y-h)/\mu$$

Where V(y) is a flow rate component in the x direction, and h is a plane-to-plane distance. More specifically, for the calculation, the system having a size of 10 mm in the x direction, 3.2 mm in the z direction and 0.4 mm in the y direction was divided for the 1/4 region into 1×4×4 in consideration of the symmetry, in which the first viscosity coefficient μ was 1.0e−3 Pas, the second viscosity coefficient λ was 1.0e5Pas, the density ρ was 1000 $kg/m^3$, and Δt was 1 msec. The wall was under the fixing boundary conditions, and the node displacement and the flow rate were correspondingly equal to zero because of the fixed wall. The second viscosity was taken fully large to cope with the incompressible conditions. Also, the calculation was made in an unsteady state by the Newmark's β method, and the calculation results for a fully long time t=80 ms were compared with the strict solution in the steady state. It will be clear that the calculation results of the novel algorithm according to the invention is very matched with the strict solution, as shown in FIG. 6. FIG. 6 shows the time response of flow rate components in the x direction at each node position when making the calculation of FIGS. 5A to 5C.

Figure 13A:
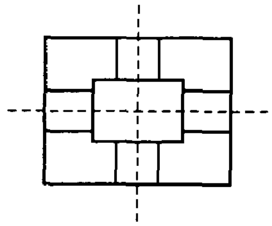
FIGS. 13A and 13B are constitutional views used for calculation of the rectangular flow path with valves.
Figure 13B:
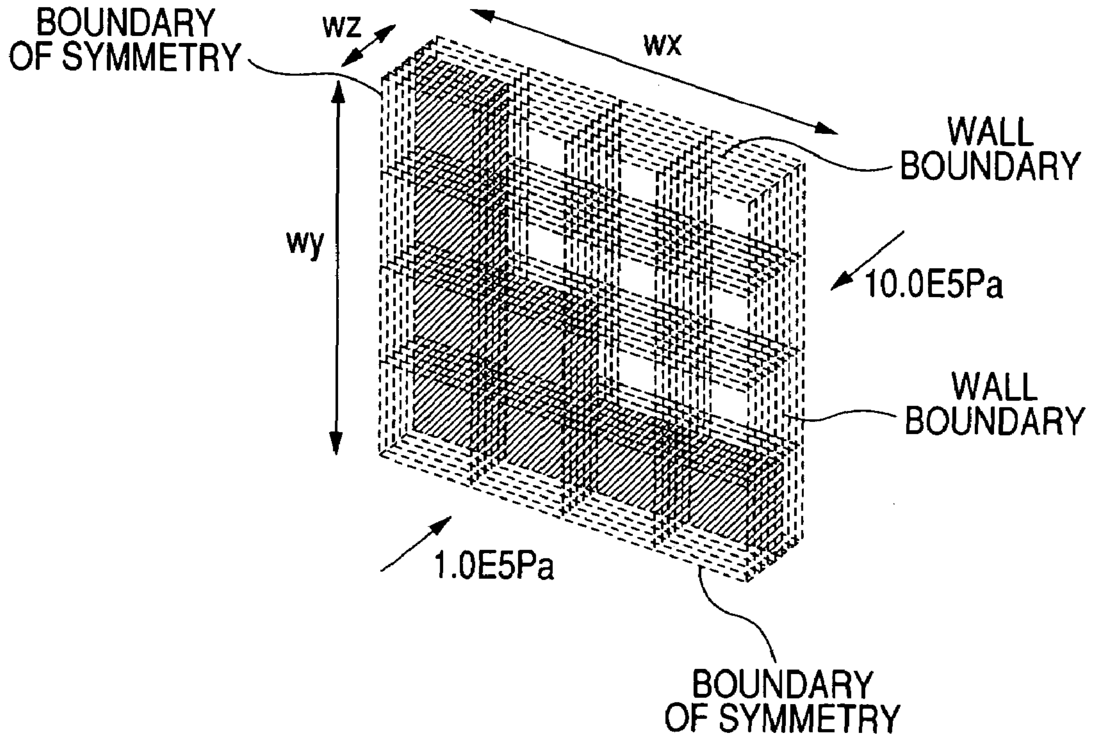

FIGS. 13A and 13B are explanatory views for explaining the construction of a flow path with a valve that was employed for calculating the step response in applying a step differential pressure thereto, in which the valve as an elastic structural body was placed in a rectangular tube as a flow path. FIG. 13A is a view of the outline of the valve, and FIG. 13B is a view showing the 1/4 region that is visualized.

Figure 14:
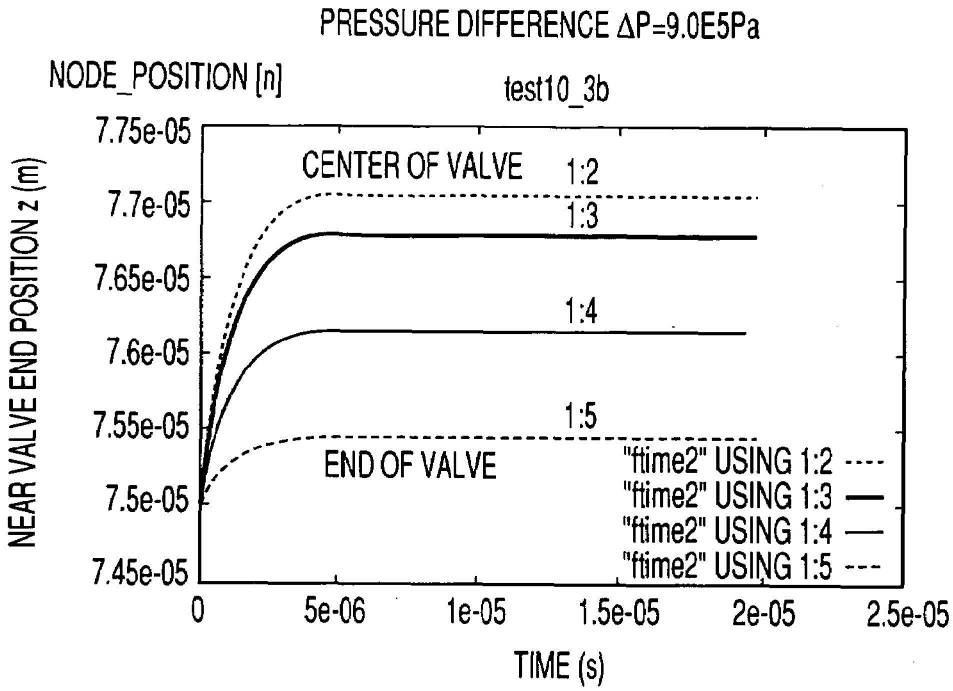
FIG. 14 is a diagram showing the results of calculating the valve displacement step response for the rectangular flow path with valves.
Figure 15:
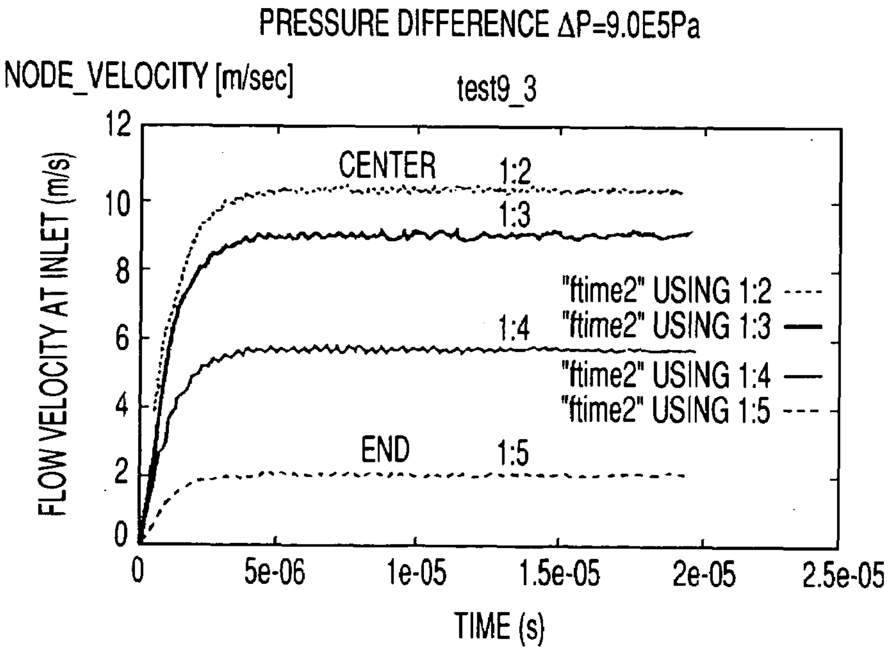
FIG. 15 is a diagram showing the result of calculating the step response for the flow rate at an inlet portion of the rectangular flow path with valves.

Herein, the valve had a cruciform construction, and it was assumed that the material constants were Young's modulus E=130.0e9 Pa, Poisson's ratio ν=0.3, and density ρ=2330.0 Kg/m$^3$. The flow path was a rectangular tube, and had a cross section of 0.4 mm×0.4 mm, and a length of 0.2 mm. In consideration of symmetry, the calculation was performed for the ¼ region, in which the space had slice widths of Δx=Δy=50 μm and Δz=25 μm, and consists of 4×4×8=128 elements. FIG. 14 is a diagram showing the step response concerning the displacement of the valve in the flow path with the valve, and FIG. 15 is a diagram showing the flow rate at an inlet portion of the flow path with the valve. Herein, the step response took place when a differential pressure of 9.0E5 Pa was applied to the rectangular tube, and the time increment Δt was 0.2μ.

Particularly, it is preferable that the external elastic solver 107 has locking avoidance means such as uniform incomplete integration or selective complete integration, in addition to complete integration, in determining the elasticity matrix to prevent the volume locking or shear locking.

The embodiment 1 has the effect that the fluid solver is simply constructed employing the external structural body solver.

Embodiment 2

Figure 8:
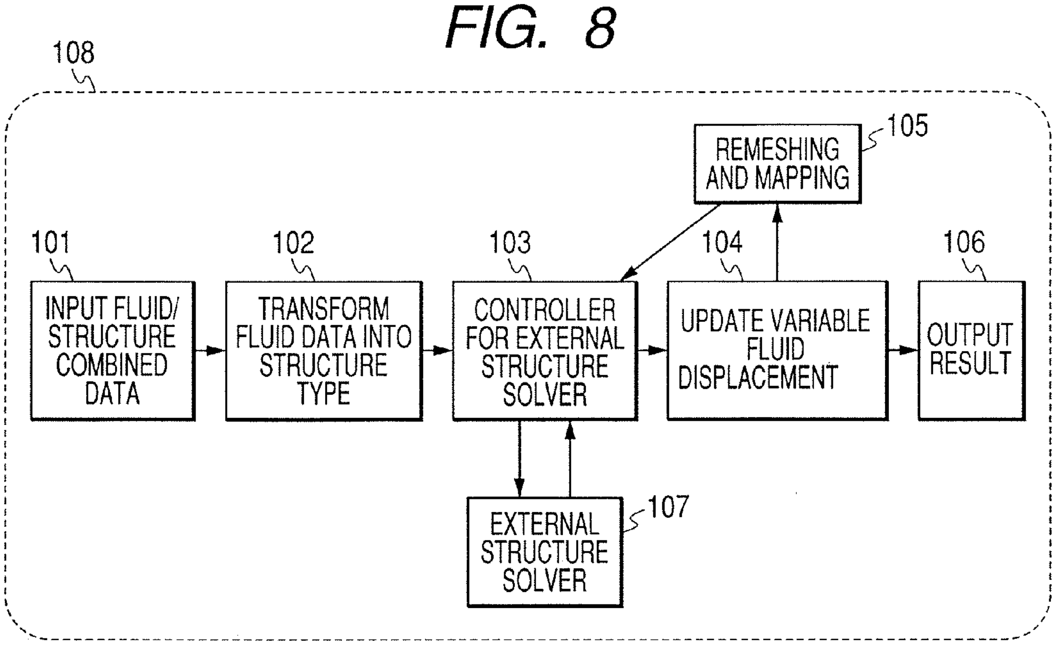
FIG. 8 is a block diagram of an embodiment 2.

FIG. 8 is a block diagram showing the features of an embodiment 2. Embodiment 2 is almost equivalent to embodiment 1, except for means 201 for inputting mixture data of fluid and elastic body.

That is, in embodiment 2, a design analysis system comprising means for inputting mixture data of fluid and elastic body, means 102 for transforming material data of the fluid into structural body data, means 103 for feeding data to an external structure calculation solver to perform structure calculation, and means 104 for updating variables and resetting the displacement of fluid.

Embodiment 2 is a design analysis system employing a design analysis method for performing calculation wherein the fluid is regarded as a structural body for a short period of time, in which coupled calculation of fluid and elastic body is performed employing an external elastic body solver with means for inputting mixture data of fluid and elastic body.

Figure 9:
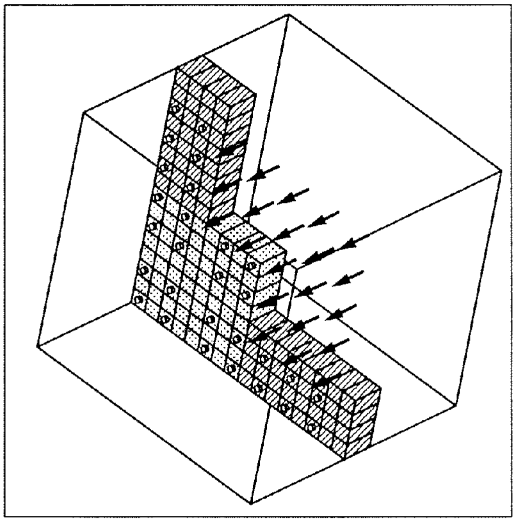
FIG. 9 is a calculation example of a rectangular flow path with valves.

FIG. 9 shows one example of calculation output in applying a step differential pressure thereto, in which a valve as an elastic structural body is placed in a rectangular tube as a flow path. Embodiment 2 has the effect that a stable fluid and structure coupled solver is constructed simply, employing an external structural body solver.

As described above, this invention has the effect that a unified calculation method for the compression and incompressible fluid and structure and a design analysis system are easily provided, employing an existent elastic body solver, and the means for transforming material data of fluid into structural body data where the fluid is regarded as an elastic body for a short period of time, whereby the setup of variables and boundary conditions is simple, the use of memory is reduced, the coding is easy, and a stable calculation is realized.

Embodiment 3

Figure 10:
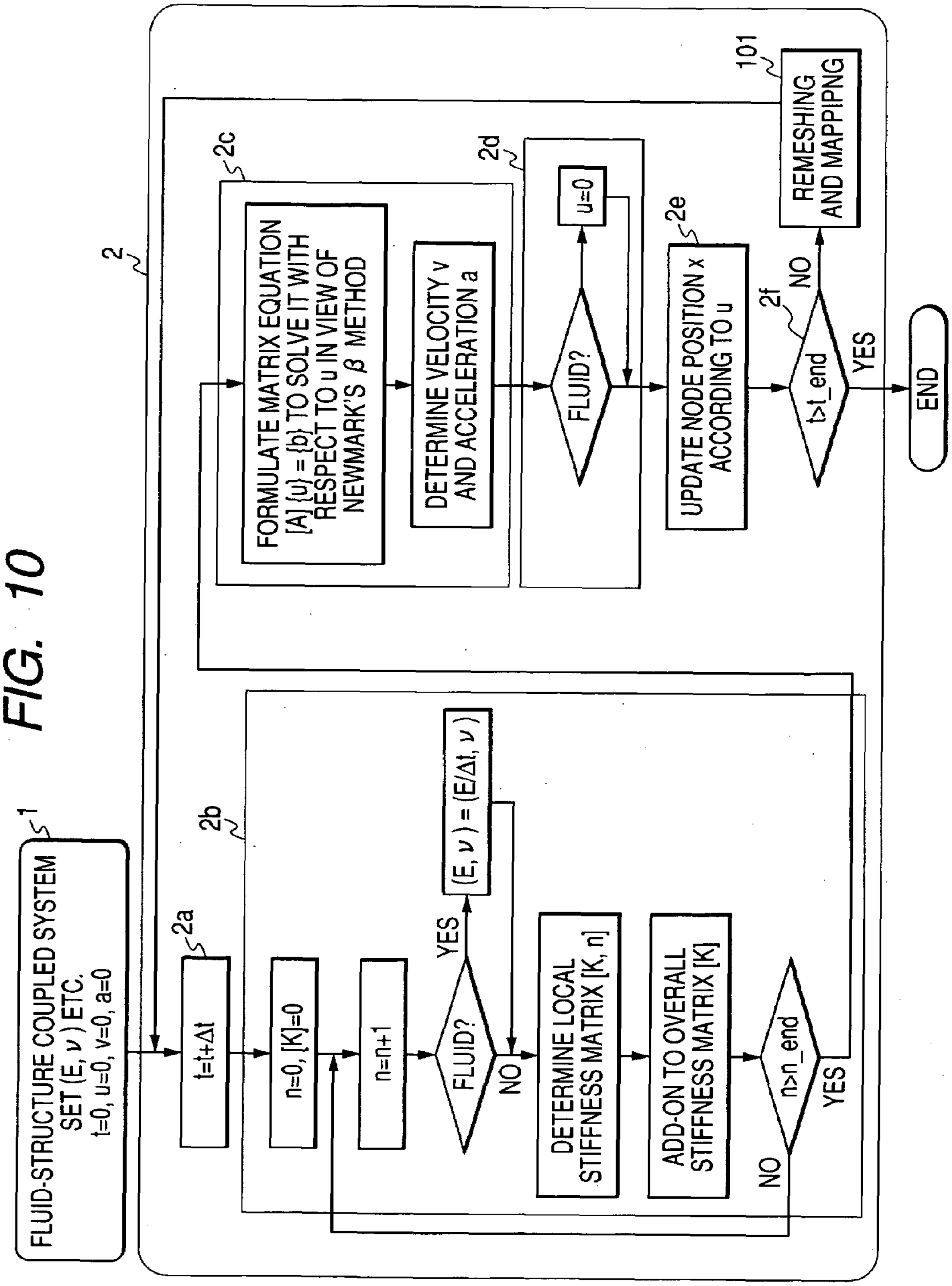
FIG. 10 is a block diagram showing the embodiment 2 of the invention.

FIG. 10 is a diagram showing the features of an embodiment 3. Reference numeral 101 designates a remeshing and mapping process.

Embodiment 3 particularly involves conducting new meshing (remeshing process) after updating the node position in accordance with the displacement, interpolating the physical quantity of original nodes and setting (mapping process) it as the physical quantity of new nodes. There is the effect that the fluid and structure calculation for large deformation is performed by remeshing and mapping after updating the node position in accordance with the displacement.

Embodiment 4

Figure 11:
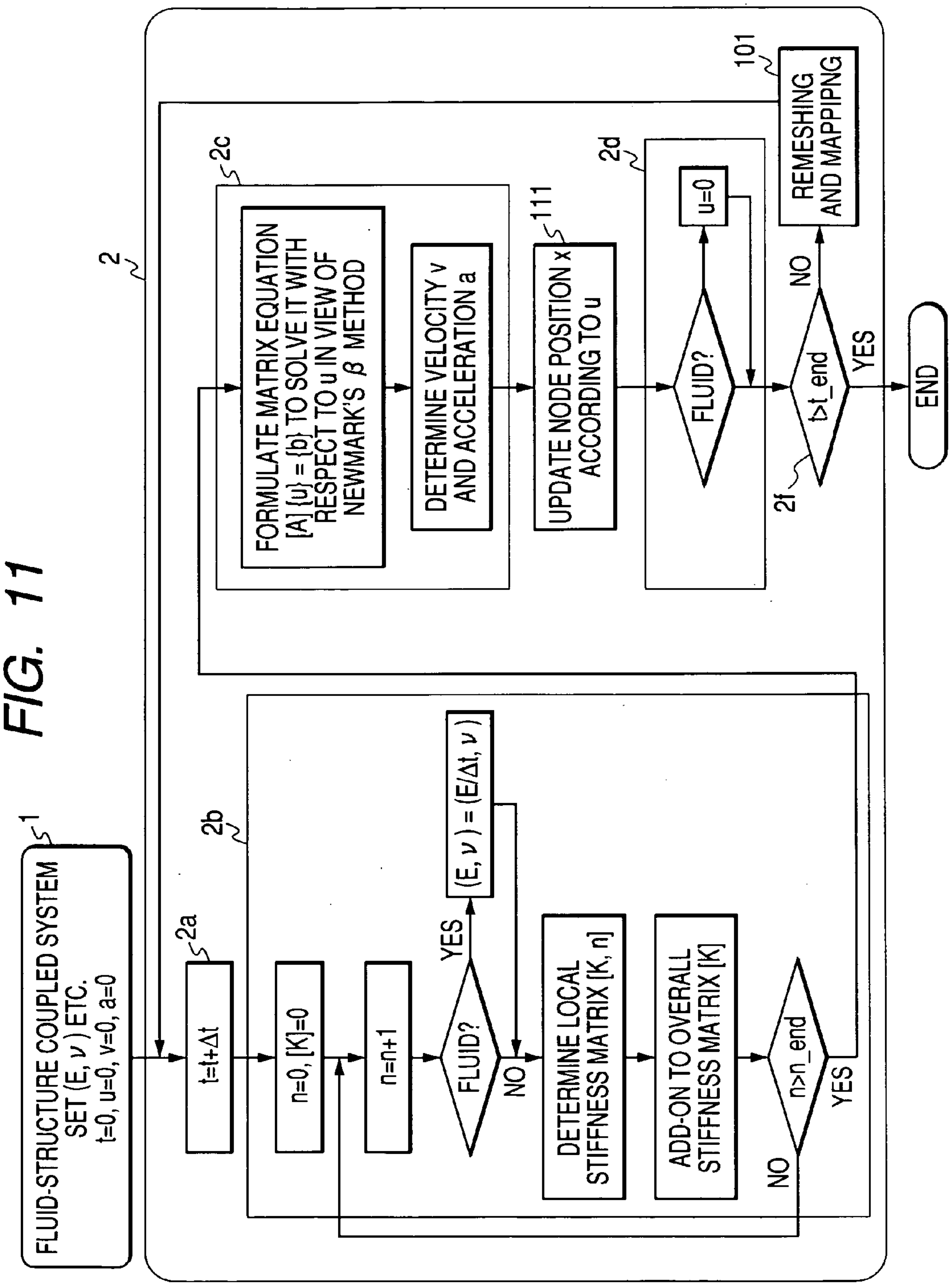
FIG. 11 is a block diagram showing an embodiment 3 of the invention.

FIG. 11 is a diagram showing the features of an embodiment 4.

While in embodiment 3, the node position x is updated according to the displacement u after the fluid displacement is set to zero, the fluid displacement may be set to zero after the node position x is updated according to the displacement u, as shown in FIG. 11, thereby giving rise to the effect that there is no collision between the structural type node and the fluid type node.

As described above, this invention may be applied singly, or by making improvements to the conventional solver such as FEM.

Figure 12:
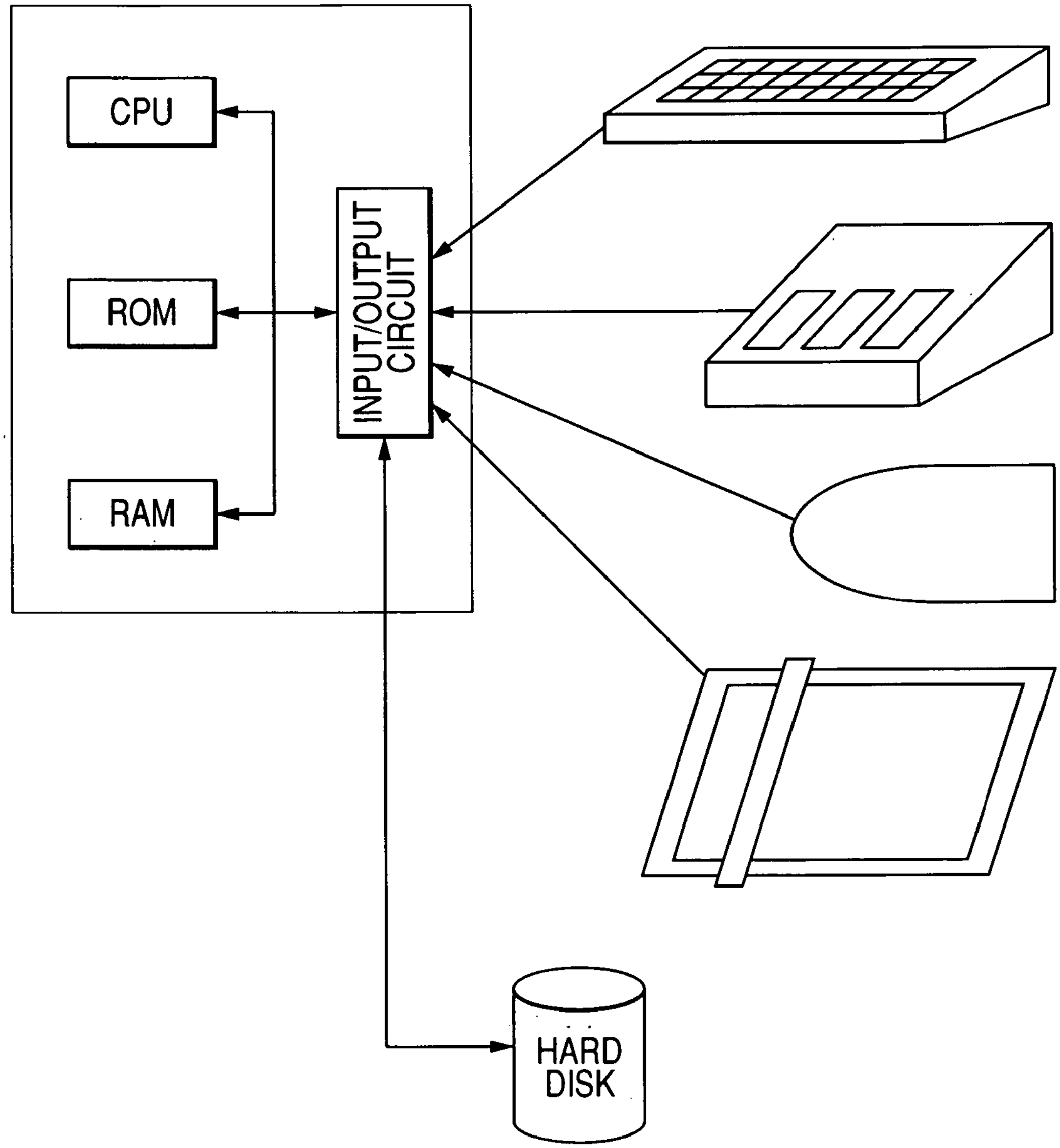
FIG. 12 is a diagram showing one example of a system for carrying out the invention.

FIG. 12 is a diagram showing the configuration of one example of the system for carrying out the invention. In FIG. 12, a CPU (Central Processing Unit), a ROM (Read Only Memory), a RAM (Random Access Memory), an input/output circuit, a keyboard, a mouse, a high resolution CRT (Cathode Ray Tube) for display, an X-Y plotter and a hard disk are shown.

A CAD apparatus is composed of a computer and peripheral devices. An information processing part comprises a CPU for performing operation, a ROM for storing a program required for the operation and various kinds of data in nonvolatile manner, a RAM for temporarily storing information to assist the operation of the CPU, and an input/output circuit 5*d* for passing information between the information processing part and the peripheral devices. The peripheral devices include a keyboard for inputting by keys characters, numbers and symbols, a mouse for inputting positional information of graphic, a high resolution CRT for displaying a three dimensional image, an X-Y plotter for making the hard copy of drawing, and a hard disk as an external device for storing drawing information, and is connected to the input/output circuit for the information processing part.

Embodiment 5

Figure 16:
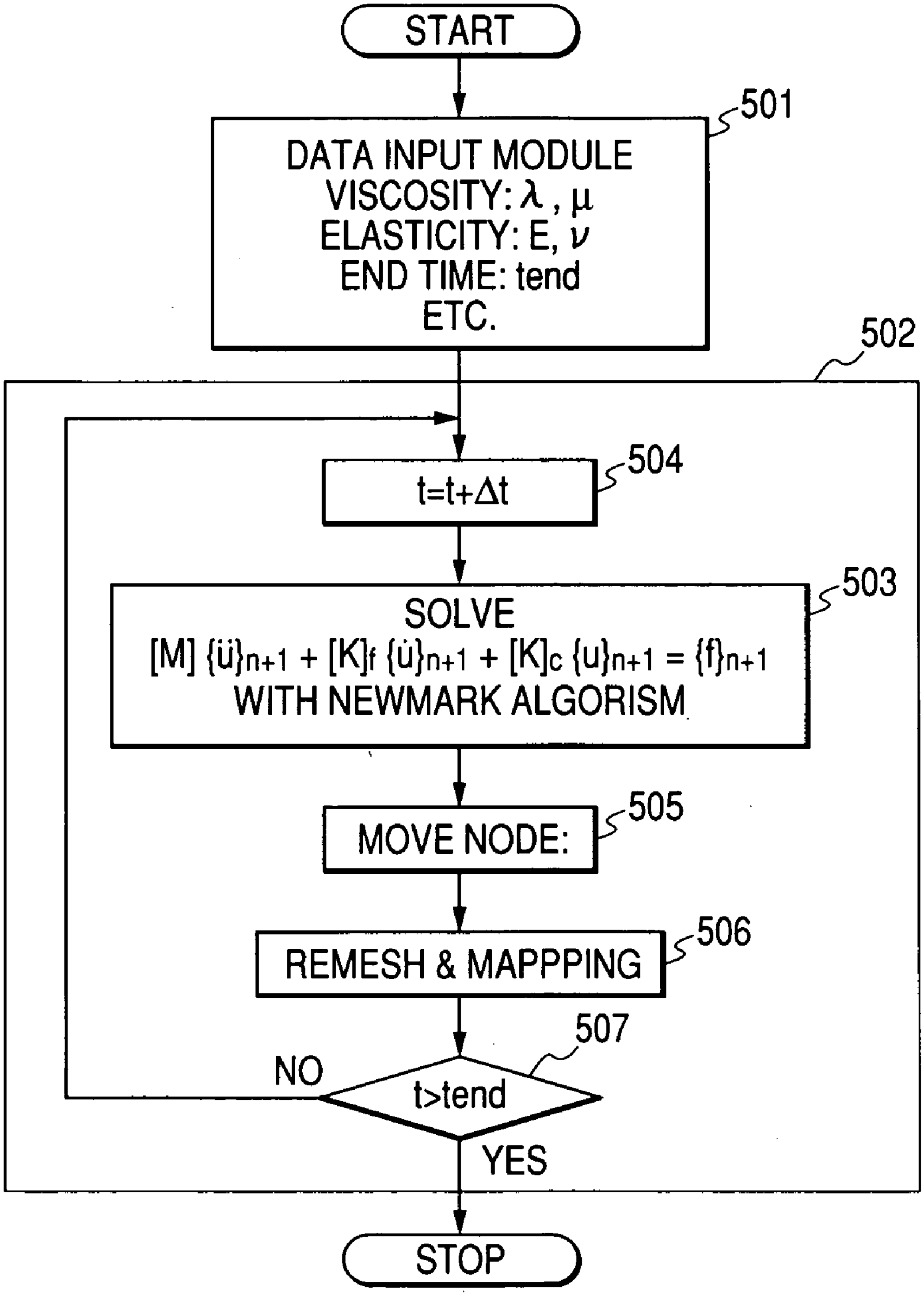
FIG. 16 is a block diagram showing an embodiment 5 of the invention.

FIG. 16 is a diagram showing the features of this embodiment of the invention.

Reference numeral 501 designates means for inputting the information of an overall system composed of fluid, elastic body and visco-elastic body (or just viscid fluid), and 502 designates means for solving the overall system by Lagrange's method.

Also, reference numeral 504 designates means for incrementing the time, 505 designates means for moving the mesh, and 506 designates means for remeshing and mapping the calculation information before remeshing to new node points. Also, reference numeral 507 designates means for determining the end of time loop.

This invention has the effect that a non-linearity problem caused by advection terms is avoided by solving the overall system including a fluid system by the Lagrange's method, and the calculation is more stable.

Also, means 501 for inputting the information of the system consisting of the fluid, elastic body and visco-elastic body and means 503 for solving a general equation of motion discretized from a governing equation including elasticity terms and viscosity terms to determine unknown displacement are provided.

Since the unknown displacement alone is a variable, and the pressure P is not employed as a variable, there is the effect that the matrix size is reduced, the memory is saved and the calculation time is shortened.

Herein, to perform calculation without having pressure P as a variable, the thermodynamic fundamental equation, which is known for the elastic body, is also employed for the fluid. That is, the stiffness matrix regarding the fluid is made isomorphic to that of the elastic body by making the thermodynamic fundamental equation regarding the fluid isomorphic to that of the elastic body.

Also, there are provided means 501 for inputting the information of a system consisting of fluid, elastic body and visco-elastic body and means 503 for solving simultaneous equations formulated by employing a general equation of motion discretized from a governing equation including elasticity terms and viscosity terms, describing the velocity and acceleration of the general equation of motion with known quantities and unknown displacements and taking the unknown displacements as variables of the simultaneous equations, whereby the solution for the simultaneous equations regarding the unknown displacement is established and solved as a linear problem.

Particularly, means for inputting the information of the system consisting of the fluid, elastic body and visco-elastic body and solving means 503 in terms of a general equation of motion discretized from a governing equation including elasticity terms and viscosity terms in accordance with the Newmark algorithm or Wilson algorithm.

A method dealing with the second order differential regarding time precisely, such as the Newmark algorithm or Wilson algorithm, is employed for both the fluid and the elastic body, giving rise to the effect that the stable and precise calculation is realized.

This embodiment has means 501 for inputting a first viscosity coefficient μ, a second viscosity coefficient λ, Young's modulus E, Poisson's ratio v, and means 503 for discretizing a governing equation: generally $$\rho\frac{D\dot{u}_i}{Dt} = \begin{cases} -\nabla P(\rho, T) + \dfrac{\partial \tau_{f,ij}(\dot{u})}{\partial x_j} + B_i \ \ldots \text{(fluid)} \\ \dfrac{\partial \tau_{e,ij}(u)}{\partial x_j} + B_i \ \ldots \text{(elastics)} \end{cases}$$

or the rewritten form for the same meaning:

$$\rho\frac{D\dot{u}_i}{Dt} = -\nabla P(\rho, T) + \frac{\partial \tau_{f,ij}(\dot{u})}{\partial x_j} + \frac{\partial \tau_{e,ij}(u)}{\partial x_j} + B_i$$

particularly, if the fluid is limited to an incompressible fluid with a constant density ρ and a constant temperature T, as a special case of the above formula:

$$\rho\frac{D\dot{u}_i}{Dt} = \begin{cases} \dfrac{\partial \tau_{f,ij}(\dot{u})}{\partial x_j} + B_i \ \ldots \text{(fluid)} \\ \dfrac{\partial \tau_{e,ij}(u)}{\partial x_j} + B_i \ \ldots \text{(elastics)} \end{cases}$$

or the rewritten form for the same meaning:

$$\rho\frac{D\dot{u}_i}{Dt} = \frac{\partial \tau_{f,ij}(\dot{u})}{\partial x_j} + \frac{\partial \tau_{e,ij}(u)}{\partial x_j} + B_i$$

$$\tau_{f,,ij}(\dot{u}) = \frac{E}{2(1+v)}\left(\frac{\partial \dot{u}_j}{\partial x_i} + \frac{\partial \dot{u}_i}{\partial x_j}\right) + \delta_{ij}\frac{Ev}{(1+v)(1-2v)}\frac{\partial \dot{u}_k}{\partial x_k}$$

$$\tau_{e,,ij}(u) = \frac{E}{2(1+v)}\left(\frac{\partial u_j}{\partial x_i} + \frac{\partial u_i}{\partial x_j}\right) + \delta_{ij}\frac{Ev}{(1+v)(1-2v)}\frac{\partial u_k}{\partial x_k}$$

to have a general equation of motion:

$$[M]\{\ddot{u}\}_{n+1} + [K]_f\{\dot{u}\}_{n+1} + [K]_e\{u\}_{n+1} = \{f\}_n + \{\nabla P(\rho, T)\}_n$$

or $$[M]\{\ddot{u}\}_{n+1} + [K]_f\{\dot{u}\}_{n+1} + [K]_e\{u\}_{n+1} = \{f\}_{n+1}$$

applying the Newmark algorithm to the general equation of motion, solving the following simultaneous linear equations regarding unknown displacements:

$$\left([K]_e + \frac{1}{\beta\Delta t}[K]_f + \frac{1}{\beta(\Delta t)^2}[M]\right)\{u\}_{n+1} = \{f\}_{n+1} + [M]\left(\left(\frac{1}{2\beta} - 1\right)\{\ddot{u}\}_n + \frac{1}{\beta\Delta t}\{\dot{u}\}_n + \frac{1}{\beta(\Delta t)^2}\{u\}_n\right) + [K]_f\left(\left(\frac{\delta}{2\beta} - 1\right)\Delta t\{\ddot{u}\}_n + \left(\frac{\delta}{\beta} - 1\right)\{\dot{u}\}_n + \frac{\delta}{\beta\Delta t}\{u\}_n\right)$$

$$[K]_e = \int\int\int [B]^t[D]_e[B]\det J d\psi d\eta d\zeta$$

$$[K]_f = \int\int\int [B]^t[D]_f[B]\det J d\psi d\eta d\zeta$$

$$[D]_e = \frac{E}{(1+v)(1-2v)}\begin{bmatrix} 1-v & v & v & 0 & 0 & 0 \\ v & 1-v & v & 0 & 0 & 0 \\ v & v & 1-v & 0 & 0 & 0 \\ 0 & 0 & 0 & \frac{1-2v}{2} & 0 & 0 \\ 0 & 0 & 0 & 0 & \frac{1-2v}{2} & 0 \\ 0 & 0 & 0 & 0 & 0 & \frac{1-2v}{2} \end{bmatrix}$$

-continued $$[D]_f = \frac{E_f}{(1+v_f)(1-2v_f)}$$

$$\begin{bmatrix} 1-v_f & v_f & v_f & 0 & 0 & 0 \\ v_f & 1-v_f & v_f & 0 & 0 & 0 \\ v_f & v_f & 1-v_f & 0 & 0 & 0 \\ 0 & 0 & 0 & \frac{1-2v_f}{2} & 0 & 0 \\ 0 & 0 & 0 & 0 & \frac{1-2v_f}{2} & 0 \\ 0 & 0 & 0 & 0 & 0 & \frac{1-2v_f}{2} \end{bmatrix}$$

$$[B] = \begin{bmatrix} \frac{\partial N_1}{\partial x}, \dots & 0 & 0 \\ 0 & \frac{\partial N_1}{\partial y}, \dots & 0 \\ 0 & 0 & \frac{\partial N_1}{\partial z}, \dots \\ \frac{\partial N_1}{\partial y}, \dots & \frac{\partial N_1}{\partial x}, \dots & 0 \\ 0 & \frac{\partial N_1}{\partial z}, \dots & \frac{\partial N_1}{\partial y}, \dots \\ \frac{\partial N_1}{\partial z}, \dots & 0 & \frac{\partial N_1}{\partial x}, \dots \end{bmatrix}$$

$$E_f = \mu(3\lambda + 2\mu)/(\lambda + \mu)$$

$$V_f = \lambda/(2(\lambda + \mu))$$

and sequentially calculating $$\{\ddot{u}\}_{n+1} = \left(1 - \frac{1}{2\beta}\right)\{\ddot{u}\}_n - \frac{1}{\beta\Delta t}\{\dot{u}\}_n + \frac{1}{\beta(\Delta t)^2}(\{u\}_{n+1} - \{u\}_n)$$

$$\{\dot{u}\}_{n+1} = \left(1 - \frac{\delta}{\beta}\right)\{\dot{u}\}_n + \left(1 - \frac{\delta}{2\beta}\right)\Delta t\{\ddot{u}\}_n + \frac{\delta}{\beta\Delta t}(\{u\}_{n+1} - \{u\}_n)$$

at each time, where Ni is an interpolation function, β, δ are Newmark variables, Δt is a short period of time, $\{u\}_{n+1}$ is node displacement, and $\{f\}_{n+1}$ is node load.

It should be noted that $\{f\}_{n+1}$ may be the node load $\{f\}_n$ at step n. Also, $\{f\}_{n+1}=\{f\}_{n+1}$ may include the node load related to pressure gradient $\{\nabla P(\rho, T)\}$. In the case of the incompressible fluid with constant density and constant temperature, $\{\nabla P(\rho, T)\}=\{0\}$.

The mesh movement means has a method for moving the mesh of both the fluid and the elastic body, a method for moving the mesh of the elastic body only, and a method (for calculation of fluid) for not moving the mesh of both the fluid and the elastic body.

Also, an algorithm for selecting whether the means 506 for remeshing and mapping is employed or not is effective.

Embodiment 6

Figure 17:
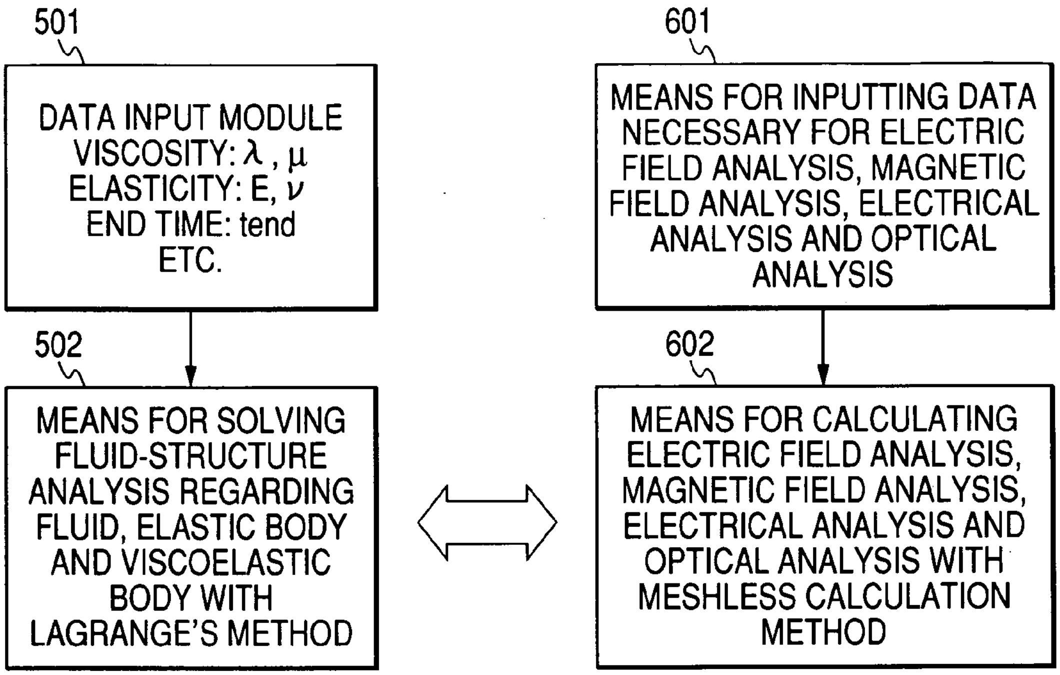
FIG. 17 is an explanatory diagram of an embodiment 6.

FIG. 17 is a diagram showing the features of an embodiment 6. This embodiment is the same as embodiment 5, except for means 501 for inputting the information of a system consisting of fluid, elastic body and visco-elastic body, means 601 for inputting data necessary for electric field analysis, magnetic field analysis, electrical analysis and optical analysis, means 502 for solving fluid structure analysis concerning the fluid, elastic body and visco-elastic body by Lagrange's method, and means 602 for calculating the electric field analysis, magnetic field analysis, electrical analysis and optical analysis by a meshless calculation method.

In embodiment 6, the fluid structure system necessarily requiring the mesh is calculated by the full Lagrange's method as shown in embodiment 5, and an electrostatic force or magnetic force acting between the structural bodies not requiring the spatial mesh relies on a highly precise method such as a boundary element method or integrating element method on the basis of the strict solution, and the optical analysis like reflection from the structural body employs the meshless calculation method, such as diffraction optical calculation, thereby giving rise to the effect that the calculation becomes precise and stable as a whole.

Embodiment 7

Figure 18:
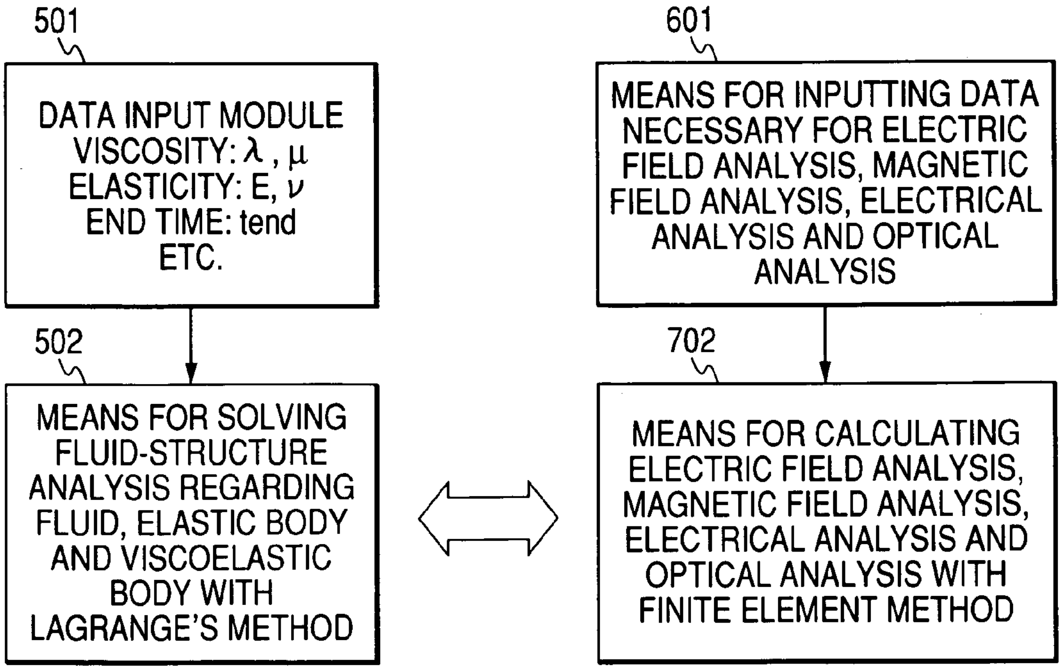
FIG. 18 is an explanatory diagram of an embodiment 7.

FIG. 18 is a diagram showing the features of an embodiment 7. This embodiment is the same as embodiment 5, except for means 501 for inputting the information of a system consisting of fluid, elastic body and visco-elastic body, means 601 for inputting data necessary for electric field analysis, magnetic field analysis, electrical analysis and optical analysis, means 502 for solving the fluid structure analysis concerning the fluid, elastic body and visco-elastic body by the Lagrange's method, and means 702 for calculating the electric field analysis, magnetic field analysis, electrical analysis and optical analysis by a finite element method.

Embodiment 7 has the effect that the fluid structure system necessarily requiring the mesh is calculated by the full Lagrange's method as shown in embodiment 5, and the coupling calculation with the electric field analysis, magnetic field analysis, electrical analysis and optical analysis is easily realized, employing the mesh.

Embodiment 8

Figure 19:
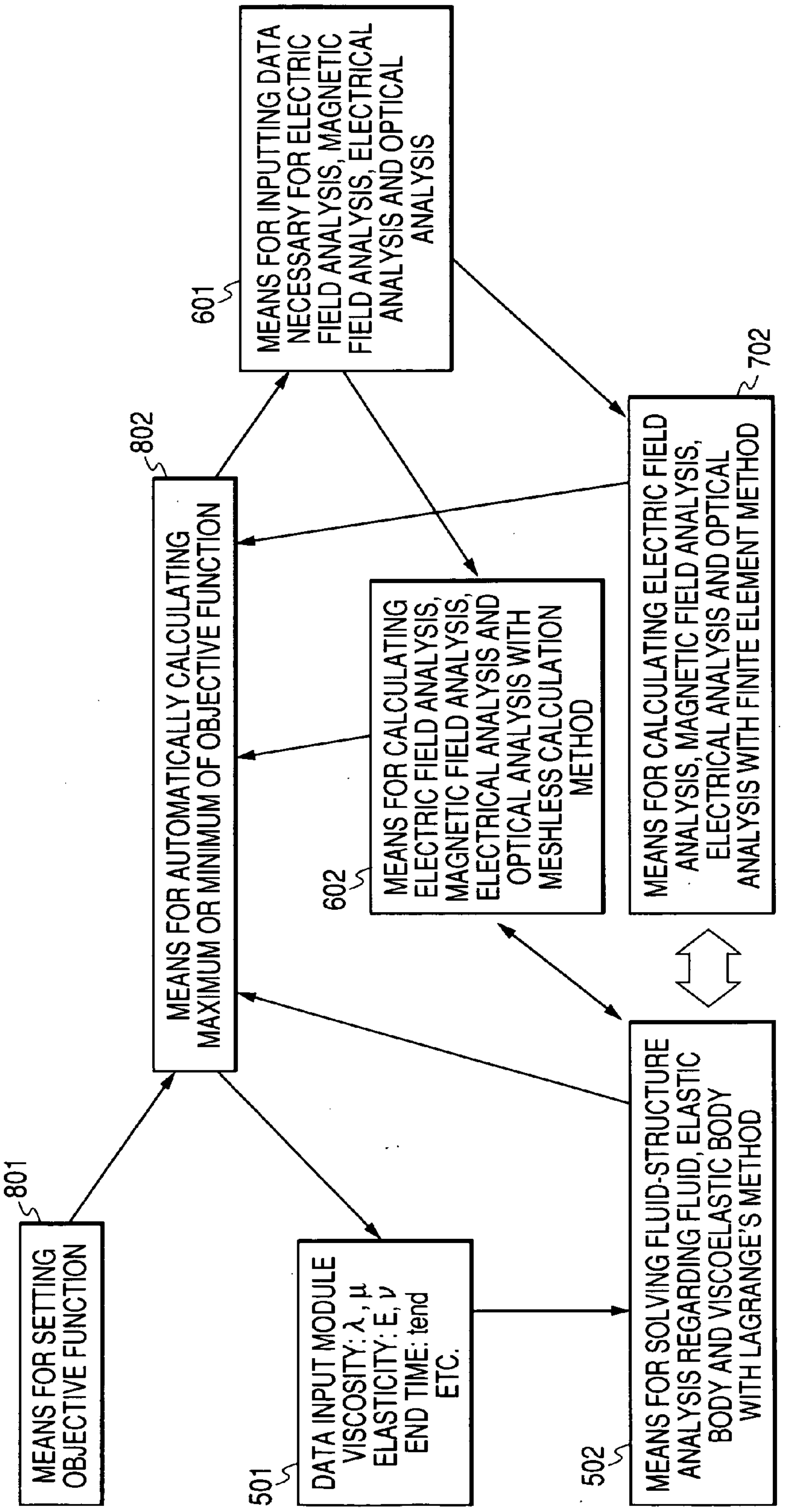
FIG. 19 is an explanatory diagram of an embodiment 8.

FIG. 19 is a diagram showing the features of an embodiment 8. This embodiment is the same as embodiments 5 to 7, except for means 501 for inputting the information of a system consisting of fluid, elastic body and visco-elastic body, means 601 for inputting data necessary for electric field analysis, magnetic field analysis, electrical analysis and optical analysis, means 502 for solving the fluid structure analysis concerning the fluid, elastic body and visco-elastic body by the Lagrange's method, means 602 for calculating the electric field analysis, magnetic field analysis, electrical analysis and optical analysis by the meshless calculation method, means 702 for calculating the electric field analysis, magnetic field analysis, electrical analysis and optical analysis by the finite element method, means 801 for setting an objective function, and means 802 for automatically calculating a maximum or a minimum of the objective function by the analytical method.

The embodiment 8 has the effect that the automatic design can be made while evaluating the objective function with the coupling analysis means as shown in embodiments 5 to 7, employing means 801 for setting the objective function and means 802 for automatically calculating the maximum or minimum of the objective function by the analytical method.

As described above, the invention has the effect of providing a unified calculation method for the compressible/incompressible fluid and structure and a design and analysis system by solving the overall fluid elastic body coupled system by the Lagrange's method, whereby the setup of variables and boundary conditions is simple, the use of memory is reduced, the coding is easily made, and stable calculation is realized.

Embodiment 9

In an embodiment 9, the compressible fluid and the incompressible fluid are treated at the same time.

Our method is a calculation method where the fluid is regarded as an elastic body, more specifically, a unified calculation method for calculating the compressible fluid, incompressible fluid and the elastic structural body, based on the hypothesis that the fluid is a substance regarded as an elastic body for a short period of time in transition through elastic moving state from a state (1) at time t1 to a state (2) at time t2, in which after transition, memory of elastic deformation is lost and the state quantity is only left.

More specifically, in a complex system consisting of the compressible fluid, incompressible fluid and elastic structural body, a unified calculation method for the compressible fluid, incompressible fluid and elastic structural body, where the fluid is regarded as an elastic body, in which pressures of the compressible fluid and incompressible fluid at each time is unitedly defined as a function of state quantities of density and temperature at each time, the viscous stress tensor is defined as a stress concerning the motion for a short period of time, like the elastic body, and the overall system unitedly makes the Lagrangian movement of the physical quantities of fluid and elastic body by directly calculating the displacement up to the next time, and employing the displacement.

The concepts of our new calculation method will be described in mode detail.

We start with the following assumption (A) or fluid notion (A).

"The fluid is such a substance that it causes transition from a state (1) at time t1 to a state (2) at time t2, through the motion state that can be regarded as an elastic body for a short period of time, and after the transition, memory of elastic deformation is lost to leave only quantity of state ( )."—hypothesis (A), fluid notion (A) The following hypothesis (B) is conceived as an auxiliary hypothesis:

"The energy loss due to viscosity is nothing but the dissipation of elastic energy caused by lost memory of elastic deformation."—hypothesis (B)

Figure 20:
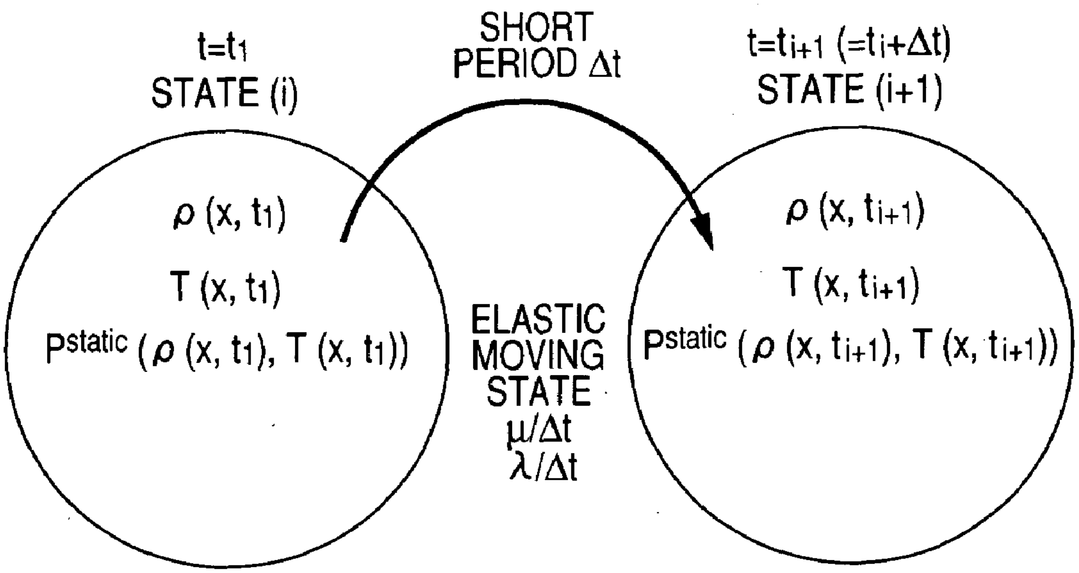
FIG. 20 is an explanatory diagram for explaining the fluid concept of the invention (fluid notion A)

FIG. 20 is a schematic diagram showing the fluid notion (A).

This hypothesis is almost equivalent to the indication that the "fluid" described in textbooks is almost equivalent to the elastic body, except that it does not maintain the elastic deformation. Also, it is almost the same idea as the simple fluid of rational continuum mechanics proposed by Truesdell and Noll. However, the conclusion naturally derived from the hypothesis (A) is different from the basic concept of the fluid constructed by Stokes in the respects of (1) physical notion of fluid, (2) concept of pressure, (3) concept of viscosity, (4) form of governing equation, and (5) calculation method. The problems (1) to (4) may have been similarly pointed out by Truesdell. Nonetheless, Truesdell's representation was still insufficient to construct a new calculation method, and had no basic elements to construct an algorithm of calculation method, like the hypothesis (A), in which the hypothesis (A) and the proposed calculation method were not disclosed or directly suggested from the previous fluid concept. As a fact, no studies for constructing a new calculation method regarding this case were disclosed from Truesdell or the field of rational continuum mechanics. In the following, the different points between conventional fluid studies and ours regarding problems (1) to (4) will be described in order.

Physical Notion

The hypothesis (A) indicates that the fluid is treated as an elastic body for a short period of time, except that the fluid has inner pressure at the start. In the conventional physical notion, it was required that the compressible fluid, incompressible fluid and elastic body were dealt with separately. Adding that, the description of complete fluid is totally abandoned, and a fluid having viscosity is only approved as the fluid.

Concept of Pressure

It is indicated that a state-type inner pressure portion indicating a state as a function of density and temperature and a viscosity-type motion stress portion regarded as an elastic stress for a short period of time in a motion state should be treated strictly distinctly. This applies to the incompressible fluid, too. Of course, it is different from the conventional concept of pressure proposed by Stokes. The concept of pressure as pointed out by Truesdell is not a unified concept of pressure, in the point that the compressible fluid and the incompressible fluid are distinguished.

Concept of Viscosity

This concept of viscosity is close to Truesdell's in that the first viscosity and the second viscosity are approved as essential physical quantities. However, it is different from the conventional suggestions of Truesdell and the researchers of rational continuum mechanics in that the viscosity is a quantity describing a motion stress portion for a short period of time, as previously described, and is common for the compressible fluid and the incompressible fluid.

Form of Governing Equation

Supposing velocity v, temperature T, density ρ, first viscosity μ, second viscosity λ, and Lagrangian differential D( )/dt, $$D\{v\}/dt=-\nabla P(T,\rho)+B(\lambda,\mu,v)$$

is the relevant governing equation, where B is a viscosity type stress portion.

Firstly, this governing equation is different from the traditional Stokes' equation because $3\lambda+2\mu\neq 0$. Although there is formal similarity to the proposed equation by Truesdell having independent variables λ, μ, it is different from Truesdell and others in that the same P, B are thought for both the compressible fluid and the incompressible fluid. In this connection, Truesdell also extracted the average pressure from the stress portion of viscosity stress tensor in the treatment of the incompressible fluid. However, the governing equation proposed in this case is different from the conventional governing equation in that extraction of the average pressure is always abandoned to establish the uniformity of the governing equation.

In the previous description, it has been pointed out that this case starting from the hypothesis (A) is greatly different from the basic concept of fluid constructed by Stokes in the respects of (1) physical notion of fluid, (2) concept of pressure, (3) concept of viscosity and (4) form of governing equation, and also different from the basic concept of fluid as disclosed by Truesdell and the researchers of rational continuum mechanics.

On the other hand, the calculation method regarding the fluid as an elastic body has not been previously proposed at all. Because all the calculation methods of fluid proposed previously assume that the isotropic average pressure exists on the basis of an inviscid fluid. The calculation method naturally derived from the hypothesis (A) has not been suggested or proposed.

Conceivably, this is related to the fact that the hypothesis (A) has different features from those of other fluid elasticity analogies in the point that the hypothesis (A) satisfies conditions for constructing the calculation procedure of fluid almost fully. That is, the hypothesis (A) is different from the previous hypotheses, in that the fluid is expressly calculated by almost the same calculation method as the elastic body, except that thermodynamic pressure as quantity of state is provided internally. The calculation method that is proposed here is to abandon the calculation method of isotropic average pressure, viz., abandon the extraction of any pressure component from a portion to the stress of elastic body in transition state. This is a procedure required for giving not a wrong answer but a correct calculation result, and may be a calculation method required for calculating correctly the sound or shock wave. Also, it has the feature of taking two viscosities as a basic amount of fluid representing the stress of elastic body in transition state, and giving away the calculation when there is no viscosity. This modification means a parting from the concept of fluid derived from "dry fluid" on the basis of the Euler's equation or Bernoulli's equation and its calculation method.

This case is aimed to offer a natural and simple fluid elastic unified coupling method in which the viscous fluid is taken as an essential fluid, employing a calculation method derived from the hypothesis (A) for the fluid elastic coupling calculation. Also, the calculation method based on the hypothesis (A) involves treating the fluid almost as an elastic body without distinction between the compressible fluid and the incompressible fluid, and is a quite preferred method for the unified calculation. That is, because of no distinction between the compressible fluid and the incompressible fluid, there is no operation of introducing compression conditions for the incompressible fluid or changing the meaning of pressure, in which the compressible and incompressible properties, like the elastic properties for a short period of time, are described as two viscosity coefficients corresponding to the Lame's constants of elastic body.

Figure 21:
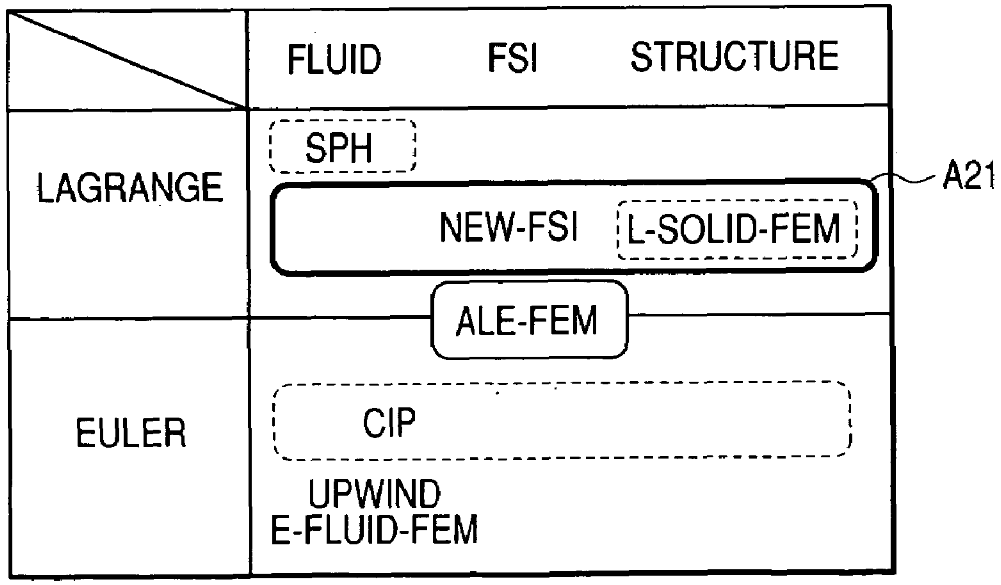
FIG. 21 is a table showing the classification of the calculation methods.

FIG. 21 shows the classification of calculation methods of fluid, elastic body and FSI (Fluid Structure Interaction) from the viewpoint of the Lagrange's method and the Euler's method. The calculation methods are largely divided into the Lagrange's method and the Euler's method. In the analysis of the structural body, the solid FEM (Finite Element Method) calculation method (denoted as L-solid-FEM) employing the Lagrange's method is common, and widely employed for the design and so on. Since definite displacement can be defined in the elastic structure analysis, the Lagrange's method is more advantageous for stably keeping the conservation rule of elements. On the contrary, the calculation methods based on the Euler's method, such as a fluid FEM calculation method (denoted as E-fluid-FEM) and an upwind difference method (denoted as Upwind), are common. This is because the Euler's method is convenient for the fluid incessantly changing in the form, because the re-meshing procedure is unnecessary. On the contrary, in the FSI calculation primarily requiring a stable calculation of structural body, an ALE (Arbitrary Lagrangian-Eulerian)-FEM calculation method in which the fluid is mostly solved by the Euler's method and the elastic body is solved by the Lagrange's method is employed for the design of jet planes and submarines.

On the other hand, it is proposed that a CIP (Cubic Interpolated Pseudo-Particle) calculation method and a C-CUP (CIP Combined Unified Procedure) method that have a fundamental merit in the unified calculation for the compressible fluid and the incompressible fluid is employed for unified calculation with the elastic body. The CIP calculation is a method belonging to the Euler's method, which advects physical quantity with an interpolation function along a stream, and has the merit of the Lagrangian method. However, since the elastic body is treated by Euler's mesh, the conservation amount of volume may not be fully kept, and it has not greatly spread in the field of FSI. Also, in the particle method of fluid calculation such as SPH (Smoothed Particle Hydrodynamics), it is disclosed that the Lagrange's calculation is also effective for the fluid. Our proposed FSI calculation has the advantage of providing the precise unified calculation method naturally matched with the conventional L-solid-FEM.

Figure 22A:
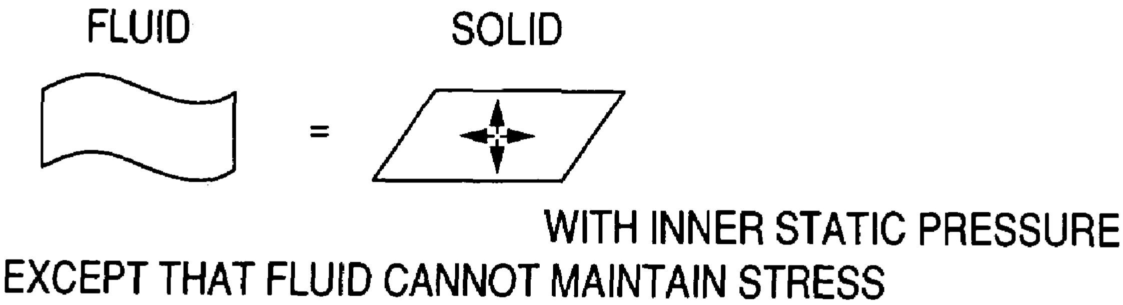
FIGS. 22A and 22B are concept diagrams for a calculation method of the invention.
Figure 22B:
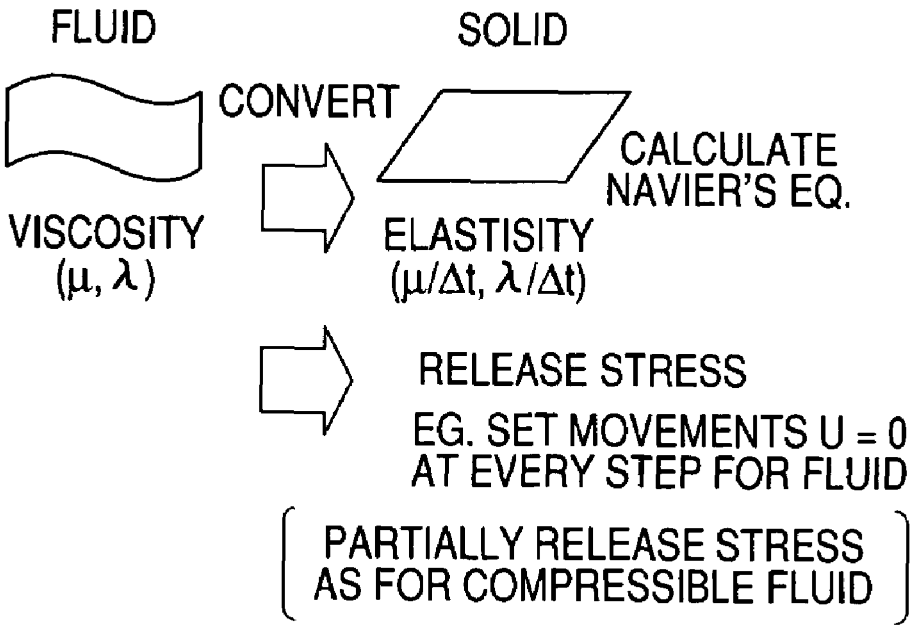

FIGS. 22A and 22B are schematic views showing the basic concept and the basic idea for new algorithm in our novel calculation method.

Figure 24A:
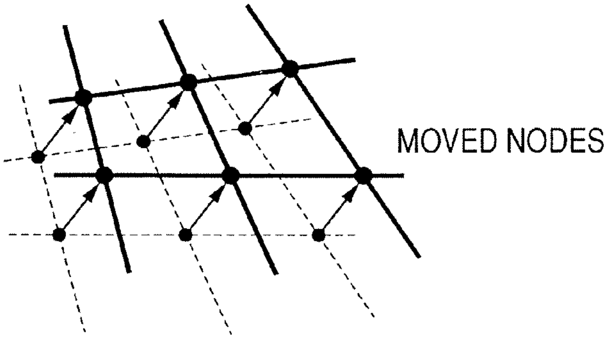
FIGS. 24A and 24B are explanatory views for explaining various methods for moving nodes.
Figure 24B:
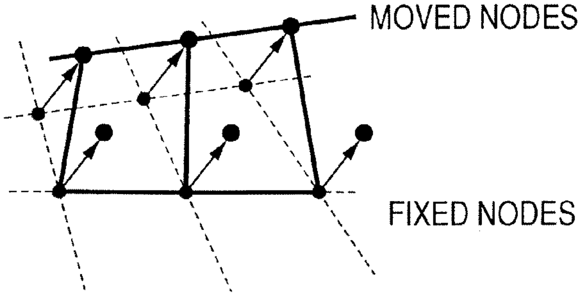

FIG. 23 is a schematic view for explaining the calculation zone in the calculation region of the system for the FSI problem. Our calculation method generally includes a region A where node points are fixed and a region B where node points move, shown in the figure. FIGS. 24A and 24B are views showing a way of moving various nodes. In FIG. 24A, the node point is moved according to displacement $\{U\}_{n+1}$ corresponding to the region B. However, in the region B, the remeshing and the mapping of physical quantity may be made. FIG. 24B is a view showing the moved nodes on the boundary between regions A and B.

Figure 25A:
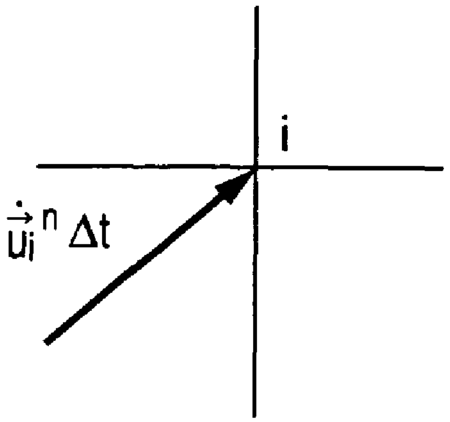
FIGS. 25A and 25B are diagrams showing the comparison between the advection method and CIP.
Figure 25B:
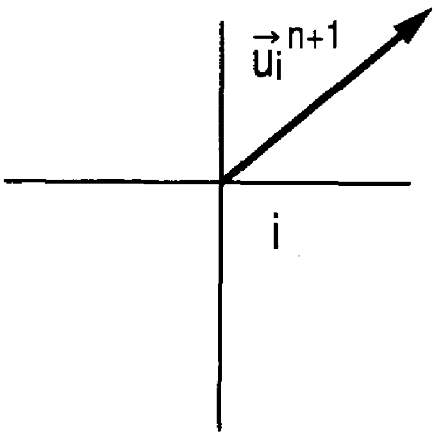

FIGS. 25A and 25B are diagrams for explaining major different points between the CIP calculation method and this case with the Lagrangian technique for advection. They are greatly different, because the CIP method considers the advection to an evaluation point I at the velocity of previous time as shown in FIG. 25A, but our method shown in FIG. 25B considers the displacement up to the next time. Especially at the fix point, the velocity at the next time that is acquired with the interpolated value or displacement, or the velocity with the displacement amount/Δt is given.

Figure 26:
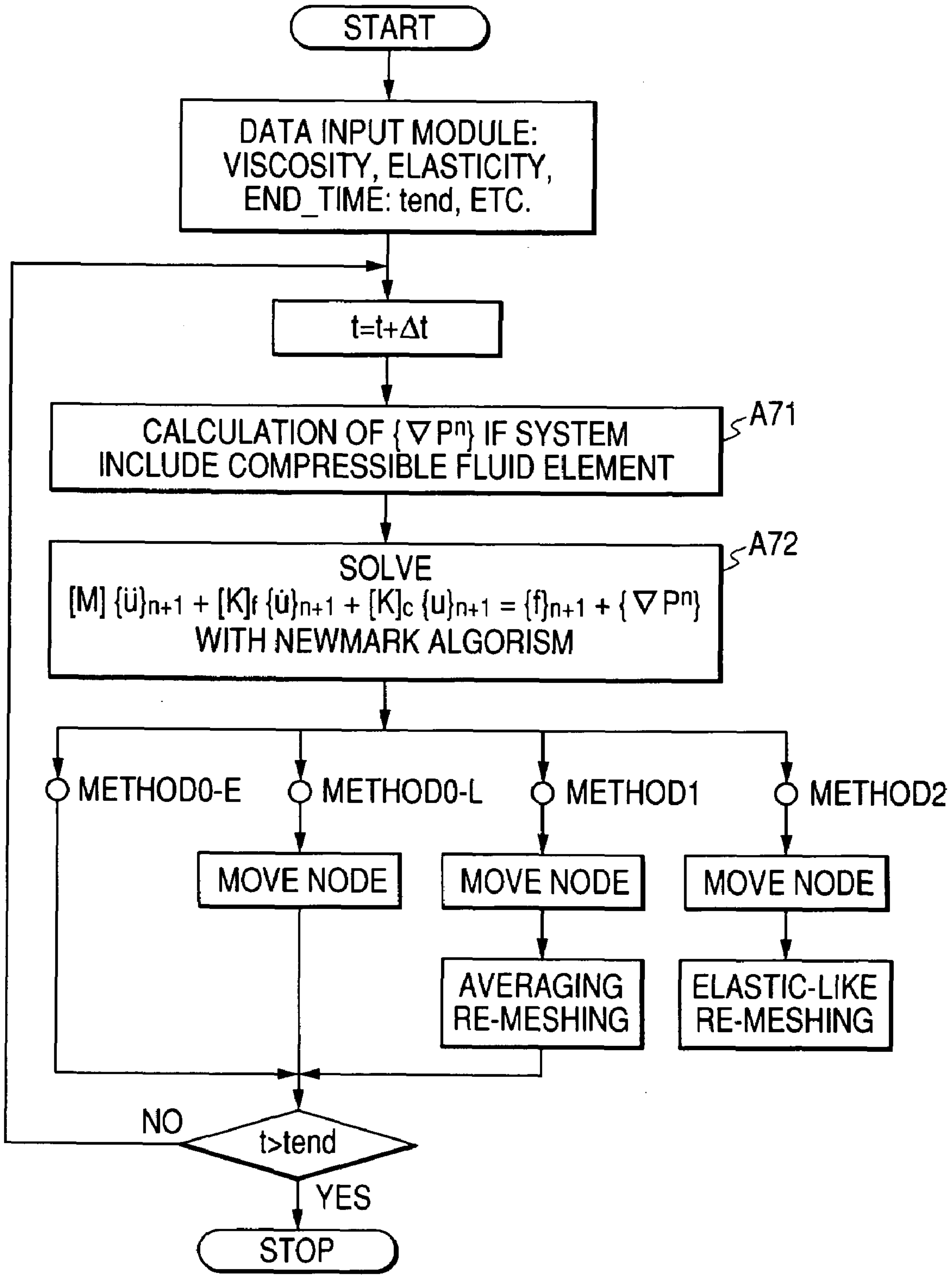
FIG. 26 is a diagram showing an algorithm of embodiment 9.

FIG. 26 is a diagram showing an algorithm of this case, which includes a part for evaluating the pressure gradient and a calculation part by adding it as a force term to the general equation of motion, as indicated at A71, A72. In an incompressible fluid portion with constant temperature and constant density, the pressure gradient term is equal to zero, but the feature of this case is to make the calculation in exactly the same way.

The calculation method of this case has the advantage that the compressible fluid and the incompressible fluid are calculated at the same calculation cost. Also, the calculation method of this case has the advantage that a complex system composed of the compressible fluid, incompressible fluid and elastic structural body is calculated at the same calculation cost as that for the single elastic structural body. As a matter of course, in the complex system, the unified calculation method of this case is as precise as the Lagrangian elastic structural body FEM calculation method, which is already put into practice, in respect of the calculation precision of the elastic structural body. More specifically, there is no discretizing error caused by calculating the fluid and the elastic body alternately, like the weak coupling FSI method. Also, there is the advantage that the solution convergence problem is relieved in solving the different equations simultaneously, like the strong coupling FSI method.

This application claims priority from Japanese Patent Applications Nos. 2004-133645, filed on Apr. 28, 2004, 2004-220387, filed on Jul. 28, 2004, and 2004-223570, filed on Jul. 30, 2004, which are hereby incorporated by reference herein.

What is claimed is:

1. A calculator, for calculating a displacement of a fluid, for use in united calculation of compressible fluid, incompressible fluid and elastic structural body, said calculator comprising:

means for calculating the displacement with the fluid regarded as an elastic structural body for a given period of time based on a hypothesis that fluid is such a substance that it causes transition from a state (1) at time t1 to a state (2) at time t2 through motion state that can be considered as an elastic body for a short period of time, and after the transition, a memory of elastic deformation is lost to leave only quantity of state, and means for storing the calculated displacement for subsequent use, wherein in a complex system composed of a compressible fluid, an incompressible fluid and an elastic structural body, said means for calculating treat pressures of the compressible fluid and the incompressible fluid at each time unitedly defined as a function of state quantities of density and temperature at each time, and treat a viscous stress tensor defined as a stress concerning motion for a short period of time similarly to elastic body, and wherein said means for calculating unitedly solves Lagrangian movement of physical quantities of fluid and elastic body by directly calculating a displacement up to a next time and employing the displacement.

2. The calculator according to claim 1, further comprising means for evaluating effect of pressure gradient $\nabla \cdot P$ at each time as a node force f, and solving a general equation of motion $[M]\{u\}''+[K]\{u\}'+[C]\{u\}=\{f\}$ including a mass matrix [M], a stiffness matrix [K], a viscosity matrix [C], a force vector {f} and a displacement vector {u} to determine the displacement vector {u} at a next time, where ' is a first order differential regarding time and " is a second order differential regarding time for the compressible fluid, the incompressible fluid and the elastic structural body.

3. The calculator according to claim 1, wherein said calculator transforms material constants of the fluid into a set of material constants where the fluid is regarded as the elastic structural body for a short period of time, and said means for calculating calculate an entire area to be analyzed as the elastic structural body using a Navier's equation that is a fundamental equation for elastic structural body.

4. The calculator according to claim 1, wherein after performing calculation for one of the given periods of time, the displacement of the fluid is reset to zero at a fluid mesh point.

5. The calculator according to claim 1, wherein a time integration method with respect to a differential equation of second order for the elastic structural body is employed.

6. The calculator according to claim 5, wherein the time integration method involves applying a Newmark's β method to the entire area to be analyzed.

7. The calculator according to claim 1, further comprising means for dividing space into minute finite elements consisting of elastic structural body elements or fluid elements, calculating a local elasticity matrix employing an appropriate set of elastic structural body material constants for elastic structural body, and calculating for the fluid elements the local elasticity matrix employing a corresponding set of elastic structural body constants that is obtained by multiplying fluid parameters including a time dimension by a short period of time Δt or 1/Δt to offset the time dimension, to determine a overall matrix, thereby solving the same general equation of motion for an overall system composed of the fluid and the elastic structural body.

8. The calculator according to claim 1, wherein said means for calculating employ the calculation procedures of generating a first node position to which the node position has been moved and updated according to the displacement, generating a second node by performing new meshing after updating the node, and interpolating physical quantity of the first node to set and update it as physical quantity of the second node.

9. The calculator according to claim 1, wherein for the fluid having a first viscosity μ and a second viscosity λ for a short period of time Δt, a Young's modulus E and a Poisson's ratio v are determined by $$E=\mu(3\lambda+2\mu)/(\Delta t(\lambda+\mu))$$

$$v=0.5\lambda/(\lambda+\mu).$$

10. The calculator according to claim 1, wherein the external structure calculation solver has a step of avoiding locking.

11. The calculator of claim 1, wherein the subsequent use is outputting of the stored displacement.

12. The calculator of claim 1, wherein the subsequent use is display of the stored displacement.

13. The calculator of claim 1, wherein the subsequent use is use of the stored displacement as an input for further calculations.

14. A program, stored on a computer-readable storage medium, in executable form, said program comprising the steps of:

inputting data of a fluid, transforming material data of the fluid, based on the input data, into structural body data with the fluid regarded as an elastic body for a short period of time, feeding the structural body data to an external structure calculation solver to execute structure calculation, including calculation of structural-node displacement, updating variables and resetting displacement of the fluid at fluid mesh nodes based on the calculation performed by the solver, and storing the calculated structural-node displacement for subsequent use.

15. The calculator of claim 14, wherein the subsequent use is outputting of the stored displacement.

16. The calculator of claim 14, wherein the subsequent use is display of the stored displacement.

17. The calculator of claim 14, wherein the subsequent use is use of the stored displacement as an input for further calculations.

* * * * *

UNITED STATES PATENT AND TRADEMARK OFFICE

CERTIFICATE OF CORRECTION

PATENT NO. : 7,337,077 B2
APPLICATION NO. : 11/115232
DATED : February 26, 2008
INVENTOR(S) : Hideyuki Sugioka It is certified that error appears in the above-identified patent and that said Letters Patent is hereby corrected as shown below:

COLUMN 1:

Line 36, "silicone" should read --silicon--; and
Line 38, "a" should be deleted.

COLUMN 5:

Line 28, "the" should be deleted; and
Line 30, "B." should read --B,--.

COLUMN 9:

Line 4, "$Kg/m^3$." should read --$kg/m^3$.--.

COLUMN 15:

Line 51, "( )." should read --(2).-- and "(A)" should read --(A).--.

COLUMN 16:

Line 37, "approved" should read --regarded--; and
Line 56, "thought" should read --taken to hold--.

COLUMN 17:

Line 9, "all. Because" should read --all, because--; and
Line 31, "giving away" should read --abandoning--.

UNITED STATES PATENT AND TRADEMARK OFFICE

CERTIFICATE OF CORRECTION

PATENT NO. : 7,337,077 B2
APPLICATION NO. : 11/115232
DATED : February 26, 2008
INVENTOR(S) : Hideyuki Sugioka It is certified that error appears in the above-identified patent and that said Letters Patent is hereby corrected as shown below:

COLUMN 20:

Line 14, "a" should read --an--;
Line 18, "employ" should read --employs--;
Line 57, "calculator" should read --program--;
Line 59, "calculator" should read --program--; and
Line 62, "calculator" should read --program--.

Signed and Sealed this

Nineteenth Day of August, 2008

JON W. DUDAS
*Director of the United States Patent and Trademark Office*